(12) United States Patent
Chao et al.

(10) Patent No.: US 10,475,117 B2
(45) Date of Patent: *Nov. 12, 2019

(54) METHOD AND APPARATUS FOR PROCESSING SALES TRANSACTION DATA

(75) Inventors: David Chao, Austin, TX (US); Brian Blount, Austin, TX (US); Joshua Toub, Austin, TX (US); Shari Gharavy, Austin, TX (US); Cheng Zhou, Austin, TX (US); Charles Erickson, Cedar Park, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/114,379

(22) Filed: May 24, 2011

(65) Prior Publication Data
US 2012/0130877 A1 May 24, 2012

Related U.S. Application Data

(62) Division of application No. 09/810,012, filed on Mar. 15, 2001, now Pat. No. 7,958,024.

(51) Int. Cl.
*G06Q 40/00* (2012.01)
*G06Q 40/02* (2012.01)
*G06Q 20/10* (2012.01)

(52) U.S. Cl.
CPC .......... *G06Q 40/02* (2013.01); *G06Q 20/102* (2013.01); *G06Q 40/00* (2013.01)

(58) Field of Classification Search
CPC ...... G06Q 40/00; G06Q 40/04; G06Q 50/188; G06Q 10/835

USPC ................. 705/35, 39, 40, 37, 80, 26.4, 336
See application file for complete search history.

(56) References Cited

U.S. PATENT DOCUMENTS

| | | |
|---|---|---|
| 4,799,156 A | 1/1989 | Shavit et al. |
| 4,831,526 A | 5/1989 | Luchs et al. |
| 5,043,891 A | 8/1991 | Goldstein et al. |
| 5,195,178 A | 3/1993 | Krieger et al. |
| 5,272,623 A | 12/1993 | Grubb et al. |

(Continued)

OTHER PUBLICATIONS

U.S. Appl. No. 60/216,913, filed Jul. 6, 2000, by A. Leigh Powell and Mark Tilly, pp. 1-11.

(Continued)

*Primary Examiner* — Lalita M Hamilton

(57) ABSTRACT

A system provides a way to manage agreements that institutions such as financial services companies have with distributors who sell their products. Each distributor has a plurality of sales representatives that earn commissions for selling such products. The commissions earned and any other constraints imposed on the sales representatives may be defined within a selling agreement. The system can generate each selling agreement utilizing a set of components representative of the type of agreement formed between the institutions and the distributor. The components of each selling agreement contain an associated rule set that enables a configuration engine to generate an appropriate document. The system also contains a set of regulatory conditions for each sale made by the sales representatives. The system may be utilized to process sales transaction data to ensure that selling agreement terms are followed and that regulations for each sale are satisfied.

39 Claims, 8 Drawing Sheets

(56) References Cited

U.S. PATENT DOCUMENTS

| | | | |
|---|---|---|---|
| 5,406,477 | A | 4/1995 | Harhen |
| 5,523,942 | A | 6/1996 | Tyler et al. |
| 5,862,328 | A | 1/1999 | Colyer |
| 5,895,459 | A | 4/1999 | Enomoto |
| 5,905,715 | A | 5/1999 | Azarmi et al. |
| 5,937,410 | A | 8/1999 | Shen |
| 5,946,660 | A | 8/1999 | McCarty |
| 6,067,531 | A | 5/2000 | Hoyt et al. |
| 6,170,014 | B1 | 1/2001 | Darago et al. |
| 6,219,652 | B1 | 4/2001 | Carter et al. |
| 6,334,111 | B1 * | 12/2001 | Carrott ............... 705/14.39 |
| 6,609,123 | B1 | 8/2003 | Cazemier et al. |
| 6,618,732 | B1 | 9/2003 | White et al. |
| 6,629,082 | B1 | 9/2003 | Hambrecht et al. |
| 6,636,867 | B2 | 10/2003 | Robertson |
| 6,662,188 | B1 | 12/2003 | Rasmussen et al. |
| 6,745,168 | B1 | 6/2004 | Enomoto |
| 6,775,674 | B1 | 8/2004 | Agassi |
| 6,789,054 | B1 | 9/2004 | Makhlouf |
| 6,901,380 | B1 | 5/2005 | Bremers |
| 6,944,514 | B1 | 9/2005 | Matheson |
| 6,952,660 | B1 | 10/2005 | Matheson |
| 6,957,220 | B2 | 10/2005 | Lamkin et al. |
| 6,965,868 | B1 * | 11/2005 | Bednarek .............. 705/7.14 |
| 6,983,261 | B1 | 1/2006 | Francisco et al. |
| 7,003,486 | B1 | 2/2006 | Condamoor et al. |
| 7,107,239 | B2 | 9/2006 | Graff |
| 7,139,731 | B1 | 11/2006 | Alvin |
| 7,228,282 | B1 | 6/2007 | Philyaw et al. |
| 7,240,017 | B2 | 7/2007 | Labelle et al. |
| 7,249,075 | B1 | 7/2007 | Altomare et al. |
| 7,383,233 | B1 | 6/2008 | Singh et al. |
| 7,428,726 | B1 | 9/2008 | Cowan et al. |
| 7,469,214 | B2 | 12/2008 | Martin et al. |
| 7,472,073 | B1 | 12/2008 | Masi |
| 7,496,525 | B1 | 2/2009 | Mitchell |
| 7,512,559 | B1 | 3/2009 | Snyder et al. |
| 7,574,329 | B1 | 8/2009 | Matheson |
| 7,672,904 | B2 | 3/2010 | Powell |
| 7,685,053 | B2 | 3/2010 | Graff |
| 7,702,563 | B2 | 4/2010 | Balson et al. |
| 7,765,161 | B2 | 7/2010 | McKenney et al. |
| 7,769,679 | B2 | 8/2010 | Skuriat |
| 7,818,423 | B1 | 10/2010 | Philyaw |
| 7,831,478 | B2 | 11/2010 | Harris |
| 7,840,498 | B2 | 11/2010 | Frank et al. |
| 7,844,835 | B2 | 11/2010 | Ginter et al. |
| 7,925,513 | B2 | 4/2011 | Chao et al. |
| 7,958,024 | B2 | 6/2011 | Chao et al. |
| 8,121,871 | B2 | 2/2012 | Young, III et al. |
| 8,260,718 | B2 | 9/2012 | Bauchot et al. |
| 8,260,719 | B2 | 9/2012 | Carrott |
| 8,412,629 | B2 | 4/2013 | Masi |
| 8,494,904 | B2 | 7/2013 | Shkedi |
| 8,626,636 | B2 | 1/2014 | Sauter et al. |
| 9,058,610 | B2 | 6/2015 | Gharavy |
| 9,076,127 | B2 | 7/2015 | Chao et al. |
| 2001/0047282 | A1 | 11/2001 | Raveis |
| 2002/0019889 | A1 | 2/2002 | Enomoto |
| 2002/0120476 | A1 * | 8/2002 | Labelle et al. ............ 705/4 |
| 2002/0152118 | A1 | 10/2002 | Hadjigeorgis |
| 2002/0156688 | A1 * | 10/2002 | Horn et al. ............ 705/26 |
| 2003/0036683 | A1 | 2/2003 | Kehr et al. |
| 2003/0120611 | A1 | 6/2003 | Yoshino et al. |
| 2003/0154121 | A1 | 8/2003 | Konnersman |
| 2004/0078305 | A1 * | 4/2004 | Weller ............... 705/27 |
| 2007/0129972 | A1 * | 6/2007 | Labelle et al. ............ 705/4 |
| 2011/0231197 | A1 | 9/2011 | Chao et al. |

OTHER PUBLICATIONS

Aimar, A. et al., Using WWW to improve software development and maintenance: application of the LIGHT system to ALEPH programs, [Online] 1995, CERN, CERN preprint, CERN document server, Switzerland, XP002542246, Retrieved from the Internet: http://preprints.cern.ch/cgi-bin/setlink?base=preprint&categ=cern&id=ECP-95-024, pp. 1-8.

The Open Group, "Component Object Model Technical Overview", The ActiveX Core Technology Reference, 1999, pp. 1-44, The Open Group, retrieved from http://pubs.opengroup.org/onlinepubs/009899899/CHP03CHP.HTM. (Per MPEP 609.04(a), Applicant points out that the year of publication is sufficiently earlier than the effective U.S. filing date and any foreign priority date so that the particular month of publication is not in issue.).

"Microsoft Component Object Model (COM): A Technical Overview of COM", adapted from an article appearing in Dr. Dobbs Journal, Dec. 1994, 1998, Microsoft Corporation, pp. 1-18, retrieved from https://www.cs.umd.edu/~pugh/com/. (Per MPEP 609.04(a), Applicant points out that the year of publication is sufficiently earlier than the effective U.S. filing date and any foreign priority date so that the particular month of publication is not in issue.).

Restriction Requirement dated Mar. 8, 2006 mailed in parent U.S. Appl. No. 09/810,012, pp. 1-5.

Response to Restriction Requirement dated Mar. 8, 2006 as filed in parent U.S. Appl. No. 09/810,012 on May 11, 2006, p. 1.

Non-Final Office Action dated Jul. 31, 2006 mailed in parent U.S. Appl. No. 09/810,012, pp. 1-15.

Response to Non-Final Office Action dated Jul. 31, 2006 as filed in parent U.S. Appl. No. 09/810,012 on Jan. 31, 2007, pp. 1-22.

Non-Final Office Action dated Apr. 19, 2007 mailed in parent U.S. Appl. No. 09/810,012, pp. 1-12.

Response to Non-Final Office Action dated Apr. 19, 2007 as filed in parent U.S. Appl. No. 09/810,012 on Oct. 19, 2007, pp. 1-15.

Final Office Action dated Jan. 9, 2008 mailed in parent U.S. Appl. No. 09/810,012, pp. 1-6.

Request for Continued Examination (RCE) and RCE Submission as filed in parent U.S. Appl. No. 09/810,012 on Jul. 9, 2008, pp. 1-17.

Non-Final Office Action dated Sep. 17, 2008 mailed in parent U.S. Appl. No. 09/810,012, pp. 1-11.

Response to Non-Final Office Action dated Sep. 17, 2008 as filed in parent U.S. Appl. No. 09/810,012 on Mar. 16, 2009, pp. 1-18.

Notice of Non-Compliant Amendment dated Jul. 7, 2009 mailed in parent U.S. Appl. No. 09/810,012, pp. 1-3.

Response to Notice of Non-Compliant Amendment dated Jul. 7, 2009 as filed in parent U.S. Appl. No. 09/810,012 on Aug. 7, 2009, pp. 1-17.

Final Office Action dated Nov. 24, 2009 mailed in parent U.S. Appl. No. 09/810,012, pp. 1-8.

Response to Final Office Action dated Nov. 24, 2009 as filed in parent U.S. Appl. No. 09/810,012 on Apr. 26, 2010, pp. 1-18.

Advisory Action dated May 21, 2010 mailed in parent U.S. Appl. No. 09/810,012, pp. 1-3.

Request for Continued Examination (RCE) and RCE Submission as filed in parent U.S. Appl. No. 09/810,012 on May 24, 2010, pp. 1-20.

Non-Final Office Action dated Jun. 22, 2010 mailed in parent U.S. Appl. No. 09/810,012, pp. 1-6.

Response to Non-Final Office Action dated Jun. 22, 2010 as filed in parent U.S. Appl. No. 09/810,012 on Oct. 22, 2010, pp. 1-16.

Notice of Allowance dated Jan. 28, 2011 mailed in parent U.S. Appl. No. 09/810,012, pp. 1-10.

PTO Miscellaneous Communication to Application regarding IDS dated Mar. 21, 2011 mailed in parent U.S. Appl. No. 09/810,012, pp. 1-8.

List of References cited by Applicant and Considered by Examiner dated Mar. 24, 2011 mailed in parent U.S. Appl. No. 09/810,012, p. 1.

* cited by examiner

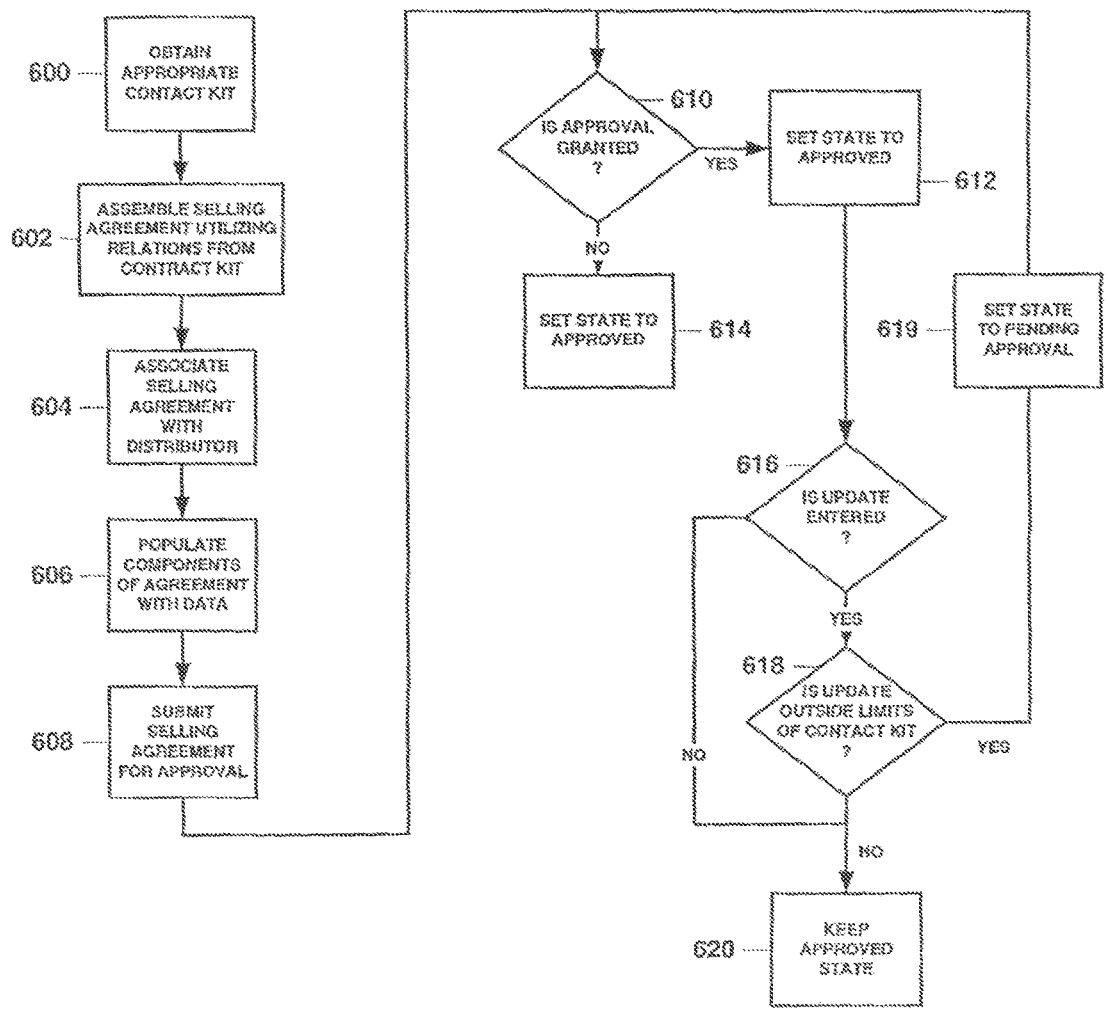

METHOD AND APPARATUS FOR PROCESSING SALES TRANSACTION DATA

CROSS-REFERENCE TO RELATED APPLICATIONS

This application is a divisional of application Ser. No. 09/810,012, filed Mar. 15, 2001 now U.S Pat. No 7,958,024, which is incorporated herein by reference in its entirety.

FIELD OF THE INVENTION

This invention relates to the field of computer technology. More specifically, the invention relates to a method and apparatus for performing processing sales transaction data.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

Managing sales and distribution channels has become a difficult task in today's business environment where it is necessary to quickly and fairly administer incentives for salespeople and distribution channel partners while coping with regulatory issues. To keep revenues growing and keep up with customer demands, financial services providers have to move quickly even when regulation, competition and new sales distribution channels inhibit growth. Management is expected to provide new opportunities for improved revenues and margins, while providing customers with better, faster information and services.

The distribution channel model within the financial services industry is very complex. Products are sold across multiple distribution channels and the workforce is very fluid, with individual distributors working for multiple companies and engaging in multiple agreements with service providers. There are regulatory constraints on the sales force in that all distributors who sell products must be licensed and appointed, or authorized, to sell those products. Financial services companies must track all of this information about their sales force, maintain a history of all of this information, provide incentive based compensation to their sales force, and calculate their compensation based upon numerous variables. Consequently, any plan for distribution channel management must consider the number of channels, the number of distributors, compensation complexity, regulatory and licensing requirements and the number and types of products that will be sold.

Financial service companies are being driven by increased competition to consider the use of independent agents in place of captive sales staff. Firms may wish to enhance and reward cross distribution channel interactions. They must be able to enhance distributor reporting and communication and effectively manage independent brokers and captive sales staff. They must reduce the time required to market new products and implement new compensation plans and differentiate themselves based on services offered to customers. In addition, they must be able to rapidly integrate new distribution channel acquisitions and grow distribution capabilities, while reducing administration costs.

Cost avoidance is essential as mergers and acquisitions have led to many disparate systems, some of which are antiquated. Firms must reduce implementation time for new products and compensation plans on these antiquated systems and reduce the potential for overpayment. The goal must be a reduction in the overall cost of administration. Accordingly, these companies must interact with the producers (of sales) using preferred methods and quickly model new and creative compensation plans, while consolidating compensation administration systems.

In order to provide sales representatives with an incentive to sell as much as possible, or to sell more of a desired product or products at certain prices, sales organizations create incentive plans where commissions are provided or offered to the sales representatives when specific sales goals or targets are achieved during particular period of time. In addition, an incentive plan may apportion credit to everyone on a sales representative's sales team, to the representative's manager, or someone other than the sales representative himself. Sales representatives typically receive compensation based on a salary, the hours worked, and/or on the goods or services sold. When basing compensation on transactions, specifically on the goods or services sold, sales representatives receive a commission that can be based on profits, net sales, the number of products sold, or some other variable. Other primary compensation includes gross dealer concessions. Secondary compensation includes expense allowances, persistency bonuses and overrides that can be allocated among sales teams and accumulated over time if desired.

Sales compensation for direct and indirect channels can be one of the most effective levers for aligning sales performance with business goals. Unfortunately, designing and administering effective incentive programs is a difficult management challenge. The management of a business can spend a great deal of time and money in developing incentive plans. In the prior art, the creation and distribution of incentive plans is a slow process that is prone to error. It can take months to implement a new compensation plan, and dependencies on computer software can frustrate sales managers who want to make even simple changes. Moreover, a lack of measurement tools can make it impossible to develop a "closed loop", continuous improvement process. Businesses must be able to design, process, and communicate sophisticated incentive programs that drive revenue growth across all sales channels. Businesses need to streamline the administration of quotas, territories, and commissions, and also require tools to measure and improve the effectiveness of incentive programs. This would greatly simplify the management challenge of aligning tactical business performance with strategic objectives, making it possible to react more quickly and effectively to changes in market and competitive conditions.

Quotas are a necessary component of most sales compensation plans, yet they are notoriously difficult to administer, especially when they involve multiple hierarchies. Not only is it easy to introduce problems like double counting and under- or over-payment, but also changes typically require long turnaround times while they are implemented by changes in computer software. The management of sales quotas is difficult and there is a need to be able to manage them easily and accurately, allowing business users to assign quotas by territory or position and across multiple hierarchies. Managers also require a capability to accurately track sales results and forecast future performance. Needed elements include the ability to tie quotas between positions and sales teams or positions and territories, make sales projections, a provision for quick and easy quota setting and editing, and a simple interface for use from the field.

Managing sales territories involves analyzing past results, assigning territories, and forecasting future sales performance. For most organizations, it is a difficult and time-consuming process with the result that it is commonly only undertaken once a year. Unfortunately, market conditions change continuously, making it practically impossible to keep sales territories aligned with business needs for more than a short period of time. A more automated process for territory management is needed to allow large sales organizations to keep up with the market.

Another need of firms in financial services is an ability to manage sales producer payment accounts by defining multiple accounts per representative, setting up payment rules for each account and procedures for adjustments. Loan issuance against customer accounts must also be managed. Loan and repayment schedules, and appropriate records, must be maintained. As a part of this activity, it is necessary to track eligible compensation against parameters established for the loan and to be able to track collection of the loan and initiate charge-back and from the producer if appropriate.

In the area of distributor administration, firms also would like to manage a shared repository for all producer information, including personal information, professional information and preferences. There is a need to provide a view of the roles played by individuals with an organization, and active selling agreements and reporting relationships. Firms would like a centralized distributor repository in order to be able to view, report and compensate producer relationships individually and holistically. In addition, they must reduce errors or miscalculations leading to overpayment. At the same time, these firms must assist new agent distribution channels in learning how to sell new types of products and create new distribution capabilities for existing products.

Credential management is a critical issue for many firms. They must track professional accreditation including licenses, appointments, National Association of Securities Dealers (NASD) registration and continuing education requirements for the maintenance of these professional accreditations to ensure that they are represented by appropriately credentialed representatives. This need is made more acute by constantly changing government rules and regulations, as well as by different regulations imposed by the different jurisdictions in which a firm operates. Firms must determine when renewal processing is required and manage new and renewal application processes to ensure regulatory compliance in every jurisdiction. A further problem is presented by representatives who may move from jurisdiction to jurisdiction in the course of their representation of a firm. Further, there is substantial turnover in representation resulting in a continuing need to ascertain the credentials of new representatives as well as to maintain contact with former representatives in the event that issues arise from their former representation.

In order to appropriately manage their representatives, firms must also be able to create customized contracts and selling agreements by combining reusable compensation components and personalizing agreement templates to fit individual producers. A selling contract defines a hierarchy of sales people that can sell products under that contract and it defines what products can be sold under that agreement. The selling contract also specifies commission schedules and identifies which sales people participate under a particular commission schedule. As multiple versions of such agreements may come into use over time, a procedure is needed to allow multiple users to maintain agreements through versioning, or version control, and a method must be provided to manage the approval process for agreement components and templates.

Any distribution management channel solution, in order to be useful, must have a capability for error correction, including manually inputting and adjusting all transaction information, making retroactive adjustments and viewing and managing ledger items. Other features that are desirable include the ability to cancel and rerun transactions.

Many financial services firms would like to be able to communicate distribution channel management information over the Internet so that producers can view the state of their relationship with a firm, including profile information, licenses, appointments, product information, contract and compensation information. Firms would also like to be able to perform modeling and "what if" analysis and have the ability to capture historical data to make strategic decisions about the effectiveness of future plans. A set of Web-based incentive management products that can be deployed to practically any sales or distribution channel would be useful. Such tools could greatly simplify the burden of designing, forecasting, launching, measuring, and refining incentives programs.

Computer software is necessary to implement the solution to these problems and fulfill the perceived needs just described. Such software commonly utilizes multiple related functions and data structures. To encapsulate these related functions and data structures, the software often utilizes a standard object oriented programming (OOP) language approach.

In conclusion, there is a need for a solution, implemented on a computer in an object oriented programming environment, that manages the contracts between the manufacturers of a product, which may include financial services, and the distributors of their product in an industry where there is multiple channel selling, a fluid workforce, and regulatory constraints. This solution should track information, such as contact points, payment methods, and the organizational hierarchies, on all parties in the system. It must manage regulatory information and ensure that distributors are licensed and appointed to sell the products manufactured, or distributed, by the provider. In addition, the solution must allow for compensation configuration and provide financial services companies with a toolkit for creating and modeling their complex commission schedules used to compensate their sales forces. This should include a provision for charge-back of commissions if appropriate. Also, the solution must model contracts between the financial services company, or provider, and the distributors who sell the products. The solution must calculate compensation for all distributors and should allow for access through the Internet.

SUMMARY OF THE INVENTION

An embodiment of the invention comprises an extensible method for managing relationships between institutions (e.g., manufacturers/supplier) associated with a product or service and the distributors of their product. Aspects of the invention are targeted at industries where there is multiple channel selling, a fluid workforce, and regulatory constraints upon products sales. For example, systems embodying the invention provide a way to manage the agreements that financial services companies have with the distributors who sell their products. Thus, organizations such as life insurances companies may utilize embodiments of the invention to manage the sale and distribution of life insurance plans in a way that coincides with the regulatory constraints put in place on such sales by government organizations.

The invention provides a way to track information about distributor's sales force, ensure that regulatory constraints are followed, maintain a transaction history of the information associated with multiple products, provide incentive based compensation to the company's sales force, and calculate sales force compensation based upon numerous variables.

One or more embodiments of the invention comprise a system executing with a computer. The computer system is configured to process transaction data by obtaining data associated with an institution (e.g., a financial institution) that has one or more instruments (e.g., product or services) it wishes to sell through a distributor. The distributor comprises a plurality of sales representatives that earn commissions for selling such products. The commissions earned and any other constraints imposed on the sales representatives may be defined within a selling agreement that is generated using the system. In one embodiment of the invention, the system generates each selling agreement utilizes a set of components representative of the type of agreement formed between the institutions and the distributor. The system may present the selling agreement to representatives associated with the institution and distributor upon completion of the agreement. The components of each selling agreement contain an associated rule set that enables a configuration engine to generate an appropriate document. The system may also contain a set of regulatory conditions that must be met for each sale made by the sales representatives. Examples, of such regulatory conditions include licenses or appointments associated with the sales of the product the selling agreement relates to. The system verifies that licenses or appointments are valid (e.g., continuing education credits are satisfied, license renewed, residency requirements satisfied, etc. . . . ).

When the selling agreement and the regulatory information is entered into the system, embodiments of the invention may be utilized to process sales transaction data to ensure that the terms of the selling agreement are followed (e.g., commission are appropriately paid) and that regulations relating to such sales are satisfied. For instance, embodiments of the invention may capture data associated with sales performed by a the sales representatives; determine if that transaction data conforms to a set of regulatory conditions associated with the sales; compute a plurality of compensation amounts based on the sale transactions data and the regulatory conditions; and execute a payment process to compensate said plurality of sales representatives for said sales.

DESCRIPTION OF THE DRAWINGS

FIG. 6 illustrates the relationships between manufactures or suppliers of products and distributors in accordance with an embodiment of the invention.

DETAILED DESCRIPTION

Figure 1:
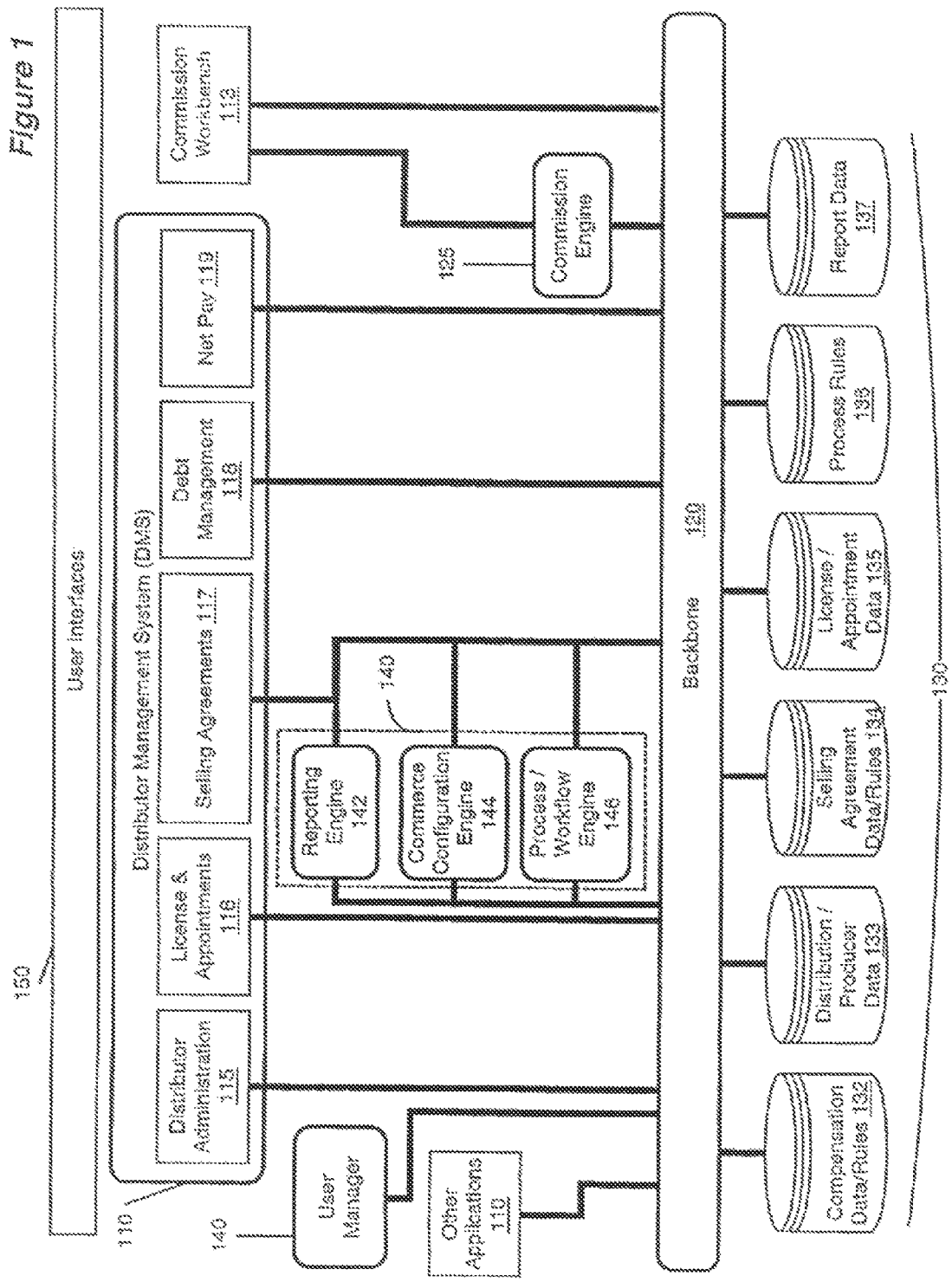
FIG. 1 illustrates a block diagram representing an embodiment of a system that utilizes the Distributor Management System Suite.

A method and apparatus for processing sales transaction data is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.
System Overview:

An embodiment of the invention comprises an extensible method for managing relationships between institutions (e.g., suppliers/manufacturers) of a product or service and the distributors of their product. Aspects of the invention are targeted at industries where there is multiple channel selling, a fluid workforce, and regulatory constraints upon products sales. For example, systems embodying the invention provide a way to manage the agreements that financial services companies have with the distributors who sell their products. Thus, organizations such as life insurances companies may utilize embodiments of the invention to manage the sale and distribution of life insurance plans in a way that coincides with the regulatory constraints of government organizations.

Such companies can utilize embodiments of the invention to track information about the company's sales force, maintain a transaction history of the information associated with multiple products, provide incentive based compensation to the company's sales force, and calculate sales force compensation based upon numerous variables. For example, the system referred to hereinafter as Distributor Management System Suite (DMSS) comprises a suite of applications that provide tracking information, such as contact points, payment methods, and organizational hierarchies on all parties in the system, managing regulatory information and ensuring that distributors are licensed and appointed to sell the products manufactured by the provider.

In one embodiment of the invention, DMSS comprises a suite of multiple engines and modules each configured to provide functionality that helps manage the flow of information between distributors and suppliers. Generally, DMSS provides users with a mechanism for managing information related to distributors, validating and tracking licenses, creating customized contracts, and maintaining compensation structures. To perform such functions the system configured in accordance with one embodiment of the invention stores information such as contract components and rules, distributor financial information, bonus schedules, and license and appointment data. The engines and modules of DMSS may, for example, be configured to perform at least the following functions:

1) Provide financial services institutions with the means to maintain organization hierarchies associated with parties on the system (e.g., distributor records), track information such as contracts, and payment methods (e.g. how a distributor is paid).
2) Manage regulatory information and ensures that distributors are licensed and appointed to sell the products manufactured by the provider.
3) Perform compensation configuration. It provides financial services companies a toolkit for creating and modeling their complex commission schedules used to compensate their sales force. For example, the system may calculate compensation for all distributors by building on top of a commission engine and using the engine, the commission models, and the agreement models to calculate the compensation for all of its sales force.
4) Models agreements or contracts between the financial services company or provider and the distributors who sell the products. These agreements are termed 'Selling Agreements'. A selling agreement defines a hierarchy of sales people that can sell products under that contract, it defines what products can be sold in that agreement, it defines what commission schedules can be used in that agreement, and it defines which sales people participate in which commission schedule. The DMSS may utilize the terms defined in selling agreements to calculate compensations for all distributors.
5) Managing information related to distributors, validating and tracking licenses, creating customized contracts, and maintaining compensation structures. The information stored in the DMSS database comprises information such as contract components and rules, distributor financial information, bonus schedules, and license and appointment data.
6) Manages payment and debt to distributors/sales representatives (e.g., net-pay and debt management).

In accordance with one embodiment of the invention DMSS is built on top of a commission engine configured to model and calculate commission for the sales force. A commission engine takes two inputs, a commission model and a set of transactions, and generates ledger items (that correspond to payments) as output. Each transaction represents a physical sales transaction, such as distributor selling a life insurance policy. The commission model represents two critical pieces of data: the sales team hierarchy and the commission schedules. The sales team hierarchy comprises a hierarchy of all sales people that will be responsible for a transaction. The commission schedules define formula for translating transactions into ledger items. Commission schedules may be modeled through quota, bonus, and plan objects. The commission model utilized in one or more embodiments of the invention is described in further detail in pending patent application Ser. No. 09/081,857, entitled "Method and Apparatus For Determining Commission", which in incorporated herein by reference.

DMSS complements the commission engine in that it provides a mechanism for modeling selling agreements with commission models. In accordance with one embodiment of the invention, at least one commission model exists for each selling agreement in DMSS. Agreement hierarchies are modeled within the sales team hierarchy. The agreement commission schedules are stored in accordance with one embodiment of the invention in the commission model's quota, bonus, and plan objects.

The commission schedules used in an agreement are often the same or similar across agreements. Therefore, the agreements are put together from contract kits. A contract kit contains a set of commission schedules (also referred to as compensation components) that can be used within an agreement. Each compensation component and contract kit is versioned, and the compensation component contains the commission schedule information needed to generate a complete commission schedule in the commission model. Each agreement is then created from one contract kit, and when the agreement is created a user can selected which components from the kit to include in the agreement. When a new version of a component or kit is created, a user can select to cascade the new version to all the agreements that use it, or to leave the agreement using the old version.

DMS provides additional functionality by allowing dependencies between models through linked hierarchies and pooling agreements. It is often common for one party to receive credit or rollup from somebody's work in a different agreement. This is accomplished through linked hierarchies. A distributor (Ted) in one agreement (AG1) make be linked to another distributor (Fred) in another agreement (AG2). This allows transactions for Fred and all of his descendants to also be credited to Ted.

It is also common for multiple parties to want to share work across agreements. For example, one may wish to use one quota to calculate qualification on a quota level, and another quota to calculate payout. In this example, one would want several parties performance to contribute to the qualification quota, even parties in different agreements. Pooling agreements provide this functionality, by pooling work from different agreement participants from potentially different agreements into one quota. An extensible object model in accordance with one embodiment of the invention provides a framework for representing such agreements.

System Components:

FIG. 1 shows a block diagram representing an embodiment of a system that utilizes the Distributor Management System Suite (DMSS) 105. As shown in FIG. 1, the DMSS comprises management modules 110, a backbone 120 allowing data exchange between applications and databases, and between applications, a commission engine 125, a number of additional data processing engines 140, and data storage and storage management components 130. The DMSS is also configured to allow for the addition of more applications and plugins 110 to provide additional services.

In an embodiment of the invention, the DMS comprises several modules and applications. In this example, the system is used by financial organizations to manage sales agreements, distributor credentials, and sales compensation. However, the reader should note that the system embodying the invention is also applicable outside of the financial services industry and that the term financial organization is utilized for illustrative purpose only. The invention is not limited solely to the financial services industry, but may be applied to other industries. For example, the system may be utilized in any business environment having a need to determine if individuals associated with a sale are appropriately licensed, compensated. The invention may also be applied to other business situations were companies must operate pursuant to the terms of an agreement.

DMSS comprises a DMS Database which may exchange data with modules and engines via backbone 120. In accordance with one embodiment of the invention, backbone 120 comprises an information infrastructure used to integrate applications 110, engines 140 and 125, and databases 130. Backbone 120 facilitates communication between data resources and modules, and integration of different computing equipment, including local networks, web interfaces, and back-office systems. Thus, backbone 120 provides a mechanism for maintaining data storage and retrieval, in addition to communicating changes and updates to the other modules. Backbone 120 is configured to retrieve data from the database in response to the needs of DMSS modules and engines and transmit that data to its requestor. Backbone 120 provides an extensible framework suitable for building and integrating applications customized for the needs of individual clients. Backbone 120 receives information from the DMSS modules and acts on it, storing the resulting object or sending it back to the module. As modules perform their tasks and functions, the backbone communicates changes and updates to the rest of the applications. Backbone 120 also provides communication between the modules by sharing data and functions. The DMSS and other applications 110, engines 140, and databases 130 may execute bi-directional requests and responses across backbone 120. Backbone 120 is configured to retrieve data from the database in response to the needs of DMSS modules and engines and transmit that data to its requestor. Backbone 120 eliminates some of the need for developing custom code, and allows developers to integrate new applications without knowing all the other applications in the system.

Engines 140 and 125 may be launched by the DMSS modules via the backbone and draw information from the DMSS databases. The engines process the information, and store the resulting object in a database or the backbone for further use by the DMSS modules and engines. A commission engine 125, configured in accordance with one embodiment of the invention, utilizes backbone 120 to gather information about agreements from the database. Commission engine 125 may, for example, identify relevant data in the database and produce a set of objects. Once the engine has processed all the objects, commission engine 125 can generate payments based on the agreements.

Workflow process engine 146, operating in accordance with one embodiment of the invention, starts and responds to workflow events received from the DMSS modules through backbone 120. Workflow process engine 146 completes the desired workflow event and sends that information back through backbone 120. In an embodiment of the invention workflow engine 146 enables users to create and run one or more business processes. The processes may be created in a formatted data input (e.g. XML or Java) and become objects (business rules) in the backbone. The workflow engine 146 enables the flow of information in the DMSS and provides users with a customizable mechanism for creating business processes.

The DMSS may comprise a commerce configuration engine 144 that allows users to define and enforce the set of rules governing how contract kit components (e.g., document components and compensation components) are combined into agreements for each distributor. The internal processes utilized by configuration engine 144 are described in further detail in U.S. Pat. No. 5,825,651, entitled "Method and Apparatus For Maintaining and Configuring System", which in incorporated herein by reference. The commerce configuration engine 144 utilizes the contract kit for creating agreements between a distributor and a financial services company.

A reporting engine 142 may be added to the DMSS and configured to generate reports and store such reports in the database. Each component of an agreement has a corresponding document, generated from report templates, which describes that component. The DMSS may also have additional modules comprising a distributor administration module 115, a license and appointment module 116, a selling agreements module 117, a debt management module 118, and a payment module to which is may be referred to also as Net Pay module 119. These modules interact with backbone 120 and engines to maintain relationships between financial services institutions and their distributors.

In one embodiment of the invention, distributor administration module 115 enables a financial services institution to record and track a broad set of information associated with the institution's distributors. The distributor information may be stored in a central database and used by all other modules of the DMS suite. Distributor information may comprise personal contact information (e.g. address, telephone, facsimile, email etc.), including information about multiple contact points, information from background checks (e.g. education, previous relationships with financial services institutions, personal credentials etc.), financial information (e.g. bank address/account information and payment, advance, repayment history etc.), license and appointment information (e.g. state and product eligibility), including current and historical license and appointment data, information about errors and omissions coverage.

Distributor information may also comprise any other type of information associated with the distributor and/or the sales of product on behalf of the institution. Distributor administration module 115 may also provide services for creating and managing distributor database information, setting up organizational entities, such as sales teams, placing individual distributors in the teams, modifying the distributor information, and creating and managing a repository for data about selling agreements established between the financial services institutions and distributors. Also, distributor administration module 115 may provide services for defining and managing relationships between different organizations (e.g. such as the financial services institution and a distributor or between regional directors and sales offices), identifying and managing calendar-based events associated with distributors such as selling agreement, licensing, and appointment renewals, background check renewals, and errors and omissions coverage renewals.

A licensing and appointments module 116 may also be integrated into the DMSS and configured to enable financial services institutions to manage the license and appointment credentials for distributors and to validate compliance with industry regulations. The licensing and appointment rules enforced by the DMS suite are applied to distributors managed by the system, whether they are employees of the financial services institution or employed by an external distributor. However, the licensing and appointment rules may be selectively enforced in the event that a user defines a set of rules defined a decision tree for performing selective enforcement.

Licensing and appointments module 116 may also provide several services comprising defining license/appointment types by company, state, and either product or product line, determining the license and appointment requirements for producers (e.g., distributors or sales representatives) based on their state of operation, the products the producer sells, the kind of compensation paid to such producers and their role, monitoring license and appointment information associated with individual producers on a calendar and schedule basis and determine when renewal application processing is required, managing the license application process for renewals, updating licenses (e.g. for new products or states). In one embodiment of the invention, licensing and appointments module 116 includes the documentation and workflow for the application approval process providing services comprising managing the appointment application process for both renewals and new appointment requests, including the documentation and workflow for the application approval process, providing license and appointment checking as required (e.g. for sales compensation or processing new business), validating that licensing/appointment requirements are met and holding activity until requirements are met.

When selling agreements module 117 is integrated into the DMSS in accordance with one embodiment of the invention, the selling agreements module 117 enables a financial services institution to define and create individual business contracts with distributors. A selling agreement defines the scope and terms of the relationship between the parties involved, commission and bonus schedules, and documents describing the relationship. In one embodiment of the invention, each selling agreement defines a hierarchy of sales people that can sell products under that contract, it defines what products can be sold in that agreement, it defines what commission schedules can be used in that agreement, and it defines which sales people participate in which commission schedule. Selling agreements are built from pre-defined contract kit components customized during negotiations. For example, a selling agreement may be formulated using contract kits comprised of components such as compensation components and document components. Each selling agreement is assembled by the system using rules (e.g., a component may be required, optional, or standard) defining the relationships between each of the components. Compensation components define the commission structure associated with a product to be sold and document components provide other information related to the agreement (e.g., contract terms etc. . . . ).

The distributor's performance is measured and commission is paid according to the terms of the agreement (e.g., defined in compensation components). In an embodiment of the invention, customizable contract kit components enable a financial services institution to define the content of contracts and the processes by which they are administered. The kits detail the rules and documentation required for the administration of the agreement. A financial services institution defines the events that may occur and provides a set of possible responses to each event using various contract kit components. Selling agreements module 117 may use contract kits to perform several tasks comprising: defining agreements that consist of contract components, defining the set of rules governing how contract kit components are combined into selling agreements for each distributor, managing the approval process for contract kit components and contract kits prior to their promotion to active use, activating contract kit components and contract kits for use, retiring contract kit components from active use, integrating with the commission engine to enable compensation calculations based upon the parameters set in the selling agreement.

In an embodiment of the invention, DMSS comprises an integrated debt management module 118 which enables a financial services institution to manage distributor advances and repayments. The debt management module enables a user to define and manage the business rules and parameters for the approval and payment of advances (e.g., via an interface). A user may make adjustments to advance balances based on actual value received from commission and accelerate repayment schedules if commissions are insufficient. The debt management module enables a user to define the rules and parameters associated with advances. The debt management module enables a user to define the following: classes of distributors who qualify for advances, qualification criteria for advances (e.g. the distributor's length of service, sales history, and past earnings), ratio of advances to projected income, taking into account any outstanding advances, repayment schedule and interest rate to be paid, source of repayment income or the policy the advance is to be recouped from, whether the amount is a percentage or flat rate, accelerated repayment schedules. For example, if a distributor's income projections fall below repayments, a user may modify the repayment terms, a user may also perform other activities such as initiating advances and repayment schedules, and tracking performance of debts.

The DMSS may also comprise a payment module 119 that enables financial institutions to track and calculate payments to distributors. Payment module 119 (also referred to as a net pay module) determines a distributor's net pay by adjusting the party's total earned compensation (calculated by commission engine 125) according to a set of payment adjustment rules. The commission engine utilized in one embodiment of the invention is described in further detail in pending patent application Ser. No. 09/081,857, entitled "Method and Apparatus For Determining Commission", which in incorporated herein by reference. These rules can be used to capture repayment schedules for outstanding debt, and transfer payments to an alternate payee. In accordance with one embodiment of the invention, payment module 119 also allows splitting up net payments into individual disbursements, directing different parts of compensation to different accounts.

In one embodiment of the invention DMSS may also comprise a user manager application 140 which defines and restricts user access and usage of the DMS suite. The system may use role-based access control, where roles are given specific permissions to data and entities. Users of the DMS suite have several levels of usage and control in the application based on the pre-defined roles. A user may customize these roles through the application user manager 140. In an embodiment of the invention, a workbench application 113 is provided to enable users to view and manage sales transactions and distributor performance data, and to run the DMS engine.

The DMSS comprises, in addition to modules and engines, a set of user interfaces 150. User interfaces comprise a browser-based system for managing the DMSS applications. This browser-based system may be implemented using any network enabling communication protocols and applications. For example, the browser-based user interface may include Java Server Pages, script based common gateway interface or any application capable of accessing the databases and producing intangible data that can be rendered by a client browser.

Information Types:

In an embodiment of the invention, the DMSS comprises several types data stored in the databases and corresponding modules, and used in module-to-module, module-to-engine, and engine-to-engine communication. The system may represent such data in data objects. Compensation data and compensation rules data objects 132 store information for the agreements module of the DMSS. This data may include contract components such as quota levels, bonus rules, and commission-based rules for eligibility. Distributor data and producer data objects 133 store information about a financial services institution's distributors for the distributor administration 115 and the other modules of the DMSS. This data includes contact information, background checks, continuing education credits, and financial information.

Selling agreements data and selling agreement rules data objects 134 provides sharing data with the Agreements module 117 of the DMSS. Information in this database includes rules for contracts between financial services institutions and distributors, data defining the terms of contracts, and commission and bonus schedules. License data and appointment data objects 135 are used by the license and appointments module 116 of the DMSS. This data includes license and appointment credentials and variations of license and appointment types (such as variations by state or product). The data is also used to validate that requirements for a license are met. Process rules data objects 136 contain information relating to the DMSS workflow service. This data includes agreement components and business rules and data. Report data objects 137 contain report data and agreement components and may share information with the report engine.

Figure 2:
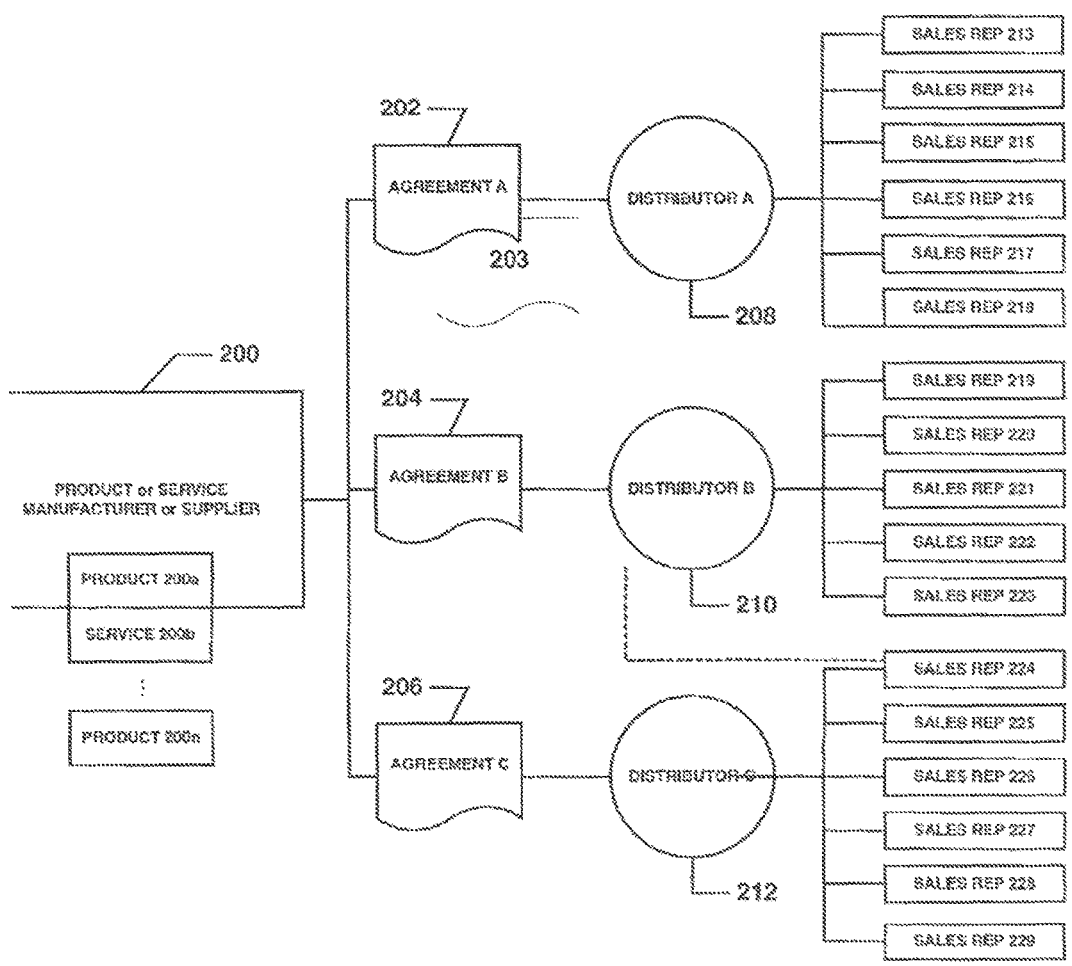
FIG. 2 illustrates the relationships between manufactures or suppliers of products and distributors in accordance with an embodiment of the invention.

System Relationships:

FIG. 2 illustrates the relationships between institutions and distributors in accordance with an embodiment of the invention. An institution may represent any party acting as the manufacturer, wholesaler, retailer, or provider for products or services distributors sell. Each institution 200 has one or more products or services to sell and may establish one or more relationships with different distributors 210 in order to sell its products or services. Each distributor has one or more sales representatives for selling products on behalf of the institution. However, a distributor may also sell products on behalf of the institution without any sales representatives. A distributor as described herein is any entity that distributes or sells products on behalf of an institution. Institutions, distributors, and sales representatives may be collectively referred to as parties and individual referred to as a party. In accordance with one embodiment of the invention the relationships between the parties are defined in an agreement. Thus, embodiments of the invention provide a mechanism for defining the agreement as it relates to the product or service to be sold by the institutions. For instance, the agreement defines the compensation amounts to be awarded to sales representatives associated with the distributor when certain products are sold. Each institution 200 may have multiple distributors 208-212 and at least one agreement is established for each relationship. For example, distributor A (208) and supplier 200 operate according to the terms set forth in agreement A (202). In some instances, more than one agreement between each party may exist. Agreement 202, for instance, may have a supplement or addendum 203 added at any time. Addendum 203 may also represent a separate agreement between the parties. In accordance with one embodiment of the invention, each distributor (208, 210, & 212) has one or more sales representatives 214-229 that are tasked with selling the product or service associated with institution 200.

When an institution reaches an agreement with a distributor, the terms of that agreement are entered into the system. The system is configured to ensure that the terms of the agreement are followed for each transaction involved between the parties. These agreements are termed selling agreements (e.g., agreements 202-206). In one embodiment of the invention selling agreements are contracts between an institution and a distributor that grant the distributor the right to represent the institution in the sale of certain products. It includes details about the conditions under which certain products may be sold, standards of conduct, and compensation schedules. It may also include distributor information such as contact points, financial information, and license and appointment pointers. Each selling agreement defines a hierarchy of sales people that can sell products (e.g., products 200a, 200b, 200n) under that contract, it defines what products can be sold in that agreement, it defines what commission schedules can be used in that agreement, and it defines which sales people participate in which commission schedule. Each institution may sell any number of products or services and there may be many different institutions.

When a sales representative sells a product the sales representative is compensated based on the agreement the distributor that sales representative works for has with the institution providing the product. If, for example, sales representative 225 sells a product on behalf of distributor C (212), sales representative 225 will earn a commission amount specified in agreement 206. The system embodying the invention contains data representative of the agreement (e.g., agreement 206) and utilizes that data to determine compensation amounts associated with each sales transaction.

When a sales representative changes distributors (e.g., starts working for a different distributor), that sales representative is associated with a different selling agreement. For example, if sales representative 224 stops working with Distributor C and begins working with distributor B (210), the selling agreement that sales representative is working pursuant to changes from agreement C (212) to agreement B (204). If the two agreements contain differing terms, the sales representative becomes subject to the differing term once that representative begins working for a different distributor. In accordance with one embodiment of the invention, the system tracks such changes and adjusts the compensation amounts accordingly.

Figure 4:
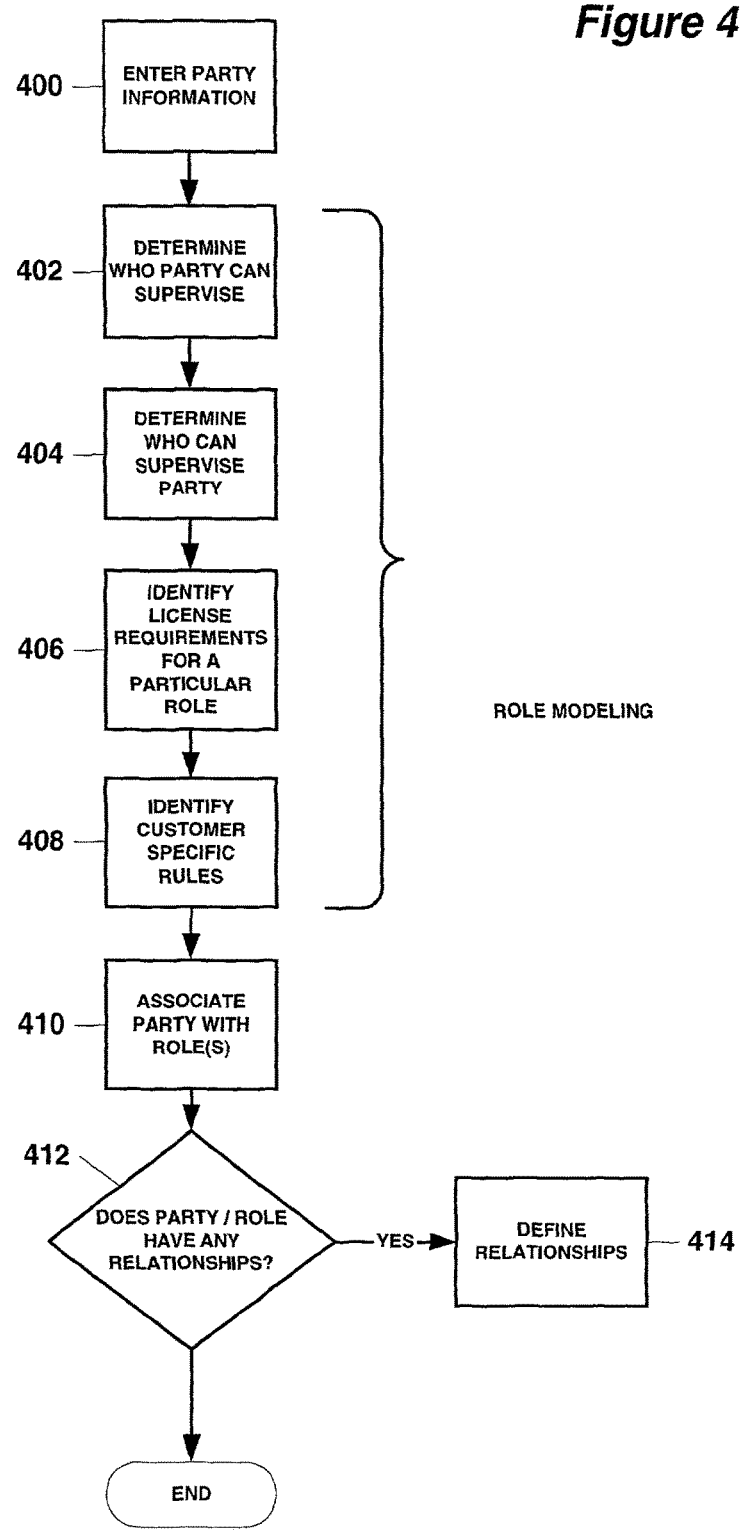
FIG. 4 illustrates the relationships between manufactures or suppliers of products and distributors in accordance with an embodiment of the invention.

Process Flow:

A) Define Parties and Party Roles:

To define a selling agreement, the information about the parties involved in selling a particular product are created and then defined (e.g., at step 300). The process of creating and defining parties is illustrated in further detail in FIG. 4. For instance, each party in the distribution channel hierarchy is defined by entering identifying information about the party (e.g., step 400). A party is an entity that can represent an individual, organization or financial services institution. Identifying information includes things such as the parties name, address, type, or any other information about a party.

Once the party information is entered into the system the each party may be identified with a role (e.g., step 408). A party may have one or more roles assigned to it. Roles indicate how a party fits into the corporate organization (e.g., identify a party's business purpose). In one embodiment of the invention, each party is associated with one of the following default roles: distributor, employer, employee, financial services organization, alternate payee. For instance, designating an individual as an employee of a distributor indicates the employee may be subject to a selling agreement the distributor has with a certain institution.

Designating a party as a distributor indicates that party is an individual or organization that may be licensed and appointed to sell products (e.g., insurance) for a manufacture or supplier (e.g., a financial services institution). The distributor receives direct or indirect compensation for the sale and delivery of the product or service of a financial services institution. Institution 200 can be either the main provider of financial products or a subsidiary of the main provider. Distributors are not examples of an institution. Roles are modeled as part of the deployment of the system. When defined for an implementation of the system, these rules include, for example:

A statement of who can supervise that role (e.g., step 402), and by whom it can be supervised (e.g., step 404). For example: role R must supervise role Re and role R must be supervised by role Rm.

The license requirements for a particular role (e.g., step 406). For example, role R requires license L.

The set of role rules associated with a specific implementation of the system can be extended to include customer-specific rules (e.g., step 408). Thus, the system is extensible such that other roles can be created. At deployment, the system may be customized for the specific needs of each installation and adapted to complement the company's business practices.

Once the role is modeled, each party is associated with a particular role (e.g., step 410). For example, a party is designated as a distributor, employer, employee, financial services organization or alternate payee.

In some instances, roles can also have defined relationships. If a role is to have an associated relationship (e.g., step 412), that relationship is defined in the system (e.g., step 414). Relationships are used in the system to represent any arbitrary relation between two entities or objects in the system. For example, a relationship links a party role to another object, usually another party or an agreement. Relationships are date-effective and have a set type, which defines the relationship between the party role and the object. For example, a party with a role of Alternate Payee may be related as a "Beneficiary" to another party.

Figure 3:
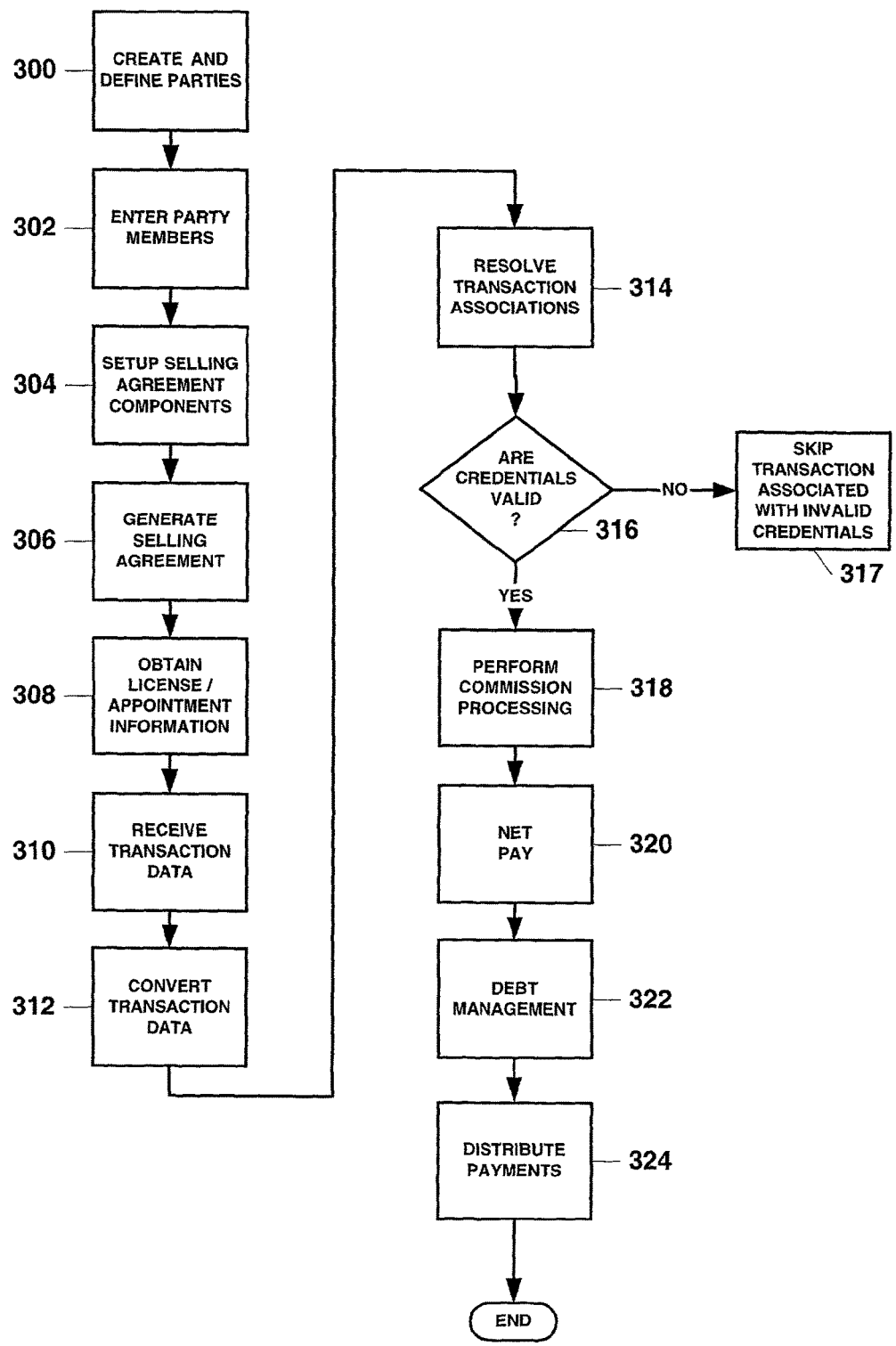
FIG. 3 illustrates the relationships between manufactures or suppliers of products and distributors in accordance with an embodiment of the invention.
Figure 5:
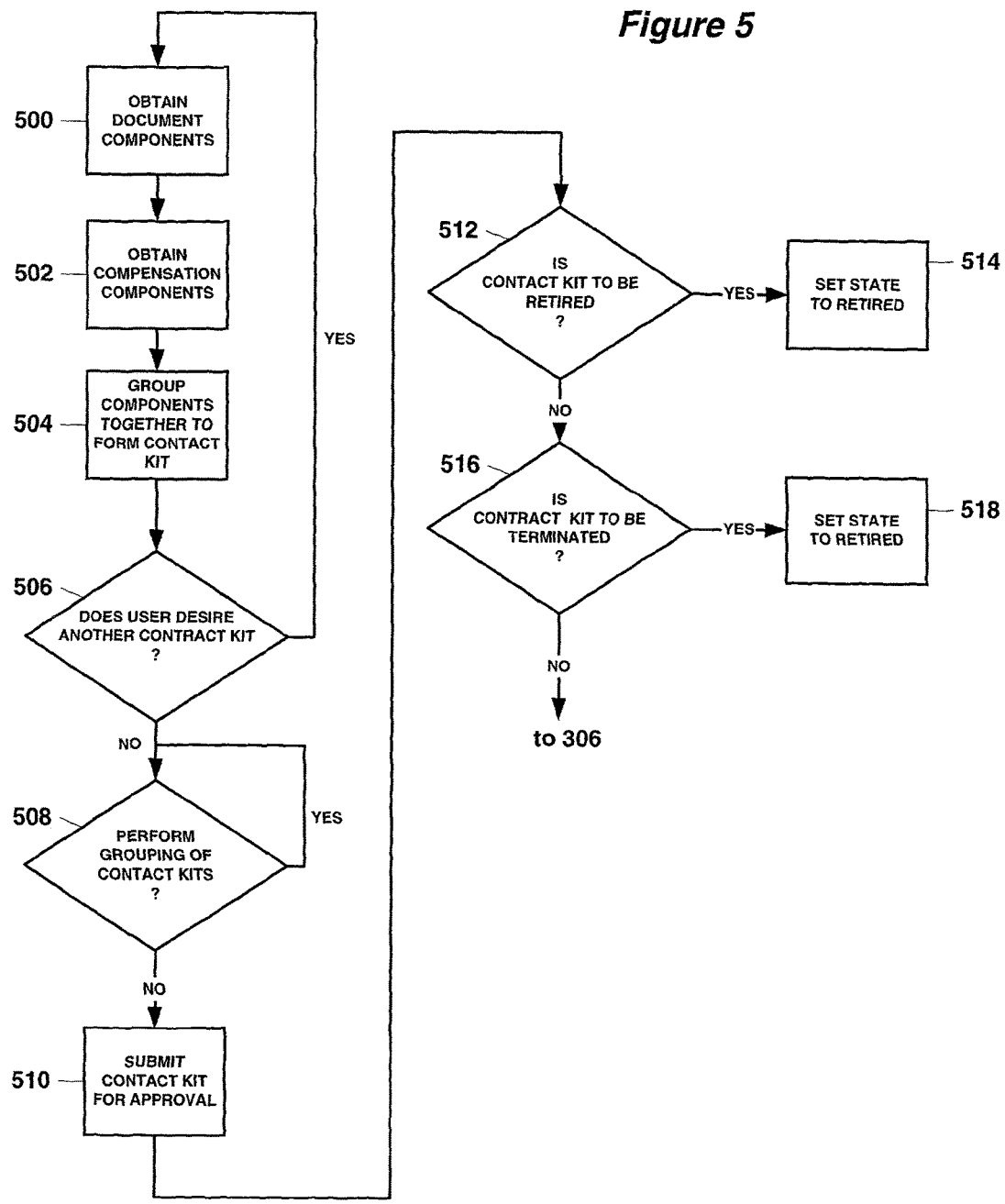
FIG. 5 illustrates the relationships between manufactures or suppliers of products and distributors in accordance with an embodiment of the invention.

Referring back to FIG. 3, once the party information and the roles associated with each party are defined, party member information (e.g., sales representatives, mangers, organization members) is entered into the system (e.g., step 302). One embodiment of the invention comprises a hierarchy management system that allows the user to enter and update arbitrary party hierarchies. A party hierarchy includes both organizational entities within the distribution channel and individuals (individual producers and supervisory/managerial positions). The hierarchy can also include individuals who do not play a sales or service role. Updates to party hierarchies include merging and splitting hierarchies. Updates to the sales hierarchy can have effective dates associated with them to allow future and backdated changes. This hierarchy management system includes the following set of business operations:

Distributor hierarchy and information
Record a new distributor
Record and manage organizations
Define and manage relationship between distributor and financial institutions/organizations
Define and manage information associated
Distributor and associated Distributor data records with a distributor
Request background checks for a distributor
Request Errors & Omissions (E&O) coverage information for a distributor
License and Appointments: (the product, jurisdiction, and institution data associated with an individual is required in order to determine licensing and appointment requirements)
Request and manage licenses for distributors
Request and manage appointments for distributors
Debt Management
Manage advance information for a distributor.
B) Setup and Generate Selling Agreement:

Once the party information and the roles associated with each party are defined, an agreement that represents the working relationship between each of the parties is setup (e.g., step 304). In one embodiment of the invention, each agreement is assembled of contact components. The process of setting up agreements is illustrated in further detail in FIG. 5. The system provides the user with an interface for creating, viewing, retiring, and terminating contract components. There are multiple types of contract components. Contract components may represent the terms and conditions of a contract, or agreement. Components can be either textual or compensation plans and include rules regarding transactions, quotas, and bonuses. In one embodiment of the invention each there are document, compensation, or service components. To setup a selling agreement, the user identifies a set of one or more document components and one or more compensation components that may be utilized to define aspects of the relationship between the parties (e.g., at step 500 and 502). Document components include the correspondence and documentation that describes the formal relationship between the institution and a distributor organization. Document components may also be referred to as textual components. Compensation components include the customizable compensation schedules that govern the credits and debits made against a distributor's accounts. In one embodiment of the invention compensation components are associated with the commission model discussed above. When components are group together a contract kit is formulated (e.g., step 504). The contract kit contains the details required to represent the administration and obligations of an agreement. For example, each contract kit may represent a selling agreement that defines the relationship between an institution and a plurality of distributors. Thus, a contract kit may define which contract components make up a particular type of selling agreement and whether the components are required or optional. The user may continue to setup contract kits until the user does not wish to define any additional contract kits (e.g., step 506).

An embodiment of the invention provides users with an interface for managing contract kits. The user may create (define components belonging to a contract kit), view, retire, and terminate a contract kit. Individual components may be grouped together to form groups of components (e.g., step 508). For example, the user may associate components that relate to a particular product together. Other grouping by distributor, institution, or any other desirable grouping may be performed. Once all the groupings are complete or no more grouping are desirable, the contract kit may be submitted individually or in groupings for approval (e.g., at step 510).

Once a contract kit is complete, it is submitted for approval. An authenticated user who has been given permissions to perform such approvals may approve contract kits. Thus, an embodiment of the invention contains a function that enable a user with the appropriate level of authority to approve or reject a contract kit or group of contract kits. If the contract kit is approved, the state is set to "approved"; if the contract kit is rejected, the user can associate notes with the contract. Users with the appropriate level of authority may also retire or terminate a contract kit. If the contract kit is retired (e.g., step 512), the state is set to retired (e.g., step 514), and it is no longer available for use in new active selling agreements. However, users can still update contract components and a retired contract kit. In these cases, once the updates are approved, the changes cascade to selling agreements based on the contract kit. If the contract kit is to be terminated (e.g. step 516), the state is set to "terminated" (e.g., step 518). When a contract kit is terminated, it is no longer available for use with any new or current active selling agreements. A contract kit can be terminated when all of the selling agreements based on it have been terminated. At this point the contract kit may be archived and removed from usage.

The system may utilize contract kits that remain in usage to generate selling agreements. In accordance with one embodiment of the invention, the system comprises a mechanism for creating selling agreements from a contract kit (see e.g., step 306 of FIG. 3). The specifics associated with creating a selling agreement in accordance with one embodiment of the invention are illustrated in FIG. 6. To create a selling agreement, the user identifies an appropriate contract kit from a group of one or more contract kit (e.g., step 600). The selling agreement is then assembled from the contract kit according to a set of rules and constraints that enable the system to properly generate the agreement (e.g., step 602). Each generated selling agreement is associated with a single distributor organization (e.g., step 604).

Once created, the components of the selling agreement (documentation and compensation) can be populated or customized (e.g., step 606). Once the user completes all required components, the selling agreement may be submitted for approval (e.g., step 608). If the definition of the selling agreement is within the limits defined for automatic approval, the system changes the agreements state to approved; otherwise system submits the agreement for approval by an authorized user. Users with the appropriate level of authority (e.g., mangers or directors) may approve or reject a selling agreement (e.g., step 610). If approvers have update authority, they may also update the components of the selling agreement. If the selling agreement is approved, the system sets the state to approved (e.g., step 612); if the selling agreement is rejected, the user can append notes to the agreement and the state is set to rejected (e.g., step 614).

Users may also update a selling agreement that is in the approved state (e.g., step 616). If the updates go outside the limits associated with the contract kit on which the selling agreement is based (e.g., step 618), the state is set to pending approval (e.g., step 619) and the approval cycle is be performed (e.g., step 610). Otherwise the state is kept as approved (e.g., step 620).

One embodiment of the invention comprises a mechanism for performing analysis of selling agreements. Users with the appropriate level of authority may execute an analysis of selling agreements managed by the system. The analysis evaluates the state of the selling agreements and generates an exception list, which includes 1) contract kits awaiting approval, 2) selling agreements awaiting approval, and/or 3) retired contract kits with no active selling agreements associated with them. The user can structure the exception list so that different users of the system can view and respond to subsets of the full list. The system may also analyze selling agreements using historical database analysis to provide the ability to monitor profit and loss (P&L) for a selling agreement or for a group of selling agreements. An embodiment of the invention provides simulation analysis which may aid the selling agreement negotiation process by allowing simulated selling agreements to be created and their data manipulated to view the projected performance of a selling agreement.

C) Define Licensing and/or Appointments:

Referring back to FIG. 3, once a selling agreement is generated licensing information is obtained and entered into the system (e.g., at step 308). Licenses within an embodiment of the invention equate to physical licenses issued by jurisdictions (e.g., federal, state/province). To receive compensation for a sale, the system ensures that distributors are appropriately licensed and that each individual who receives compensation is appointed to make such sales (e.g., an agent). Licensing and appointments may also include those who sell or service products and others, like managers, who are paid based on someone else's sales. Continuing education credits track courses a distributor has taken. Companies may use these credits to help determine if a distributor meets appointment or license requirements. An institution is typically required when defining appointment types. (Institutions are parties in the system, just as individuals are). The system may also require a regulatory jurisdiction when defining license and appointment types. It identifies the geographical locations where licenses and appointments are applicable and valid. Jurisdictions are defined for the system in any manner conceptually linked to the licensing scheme. For example, the system may be configured to enforce federal, state, or local licensing schemes.

Figure 7A:
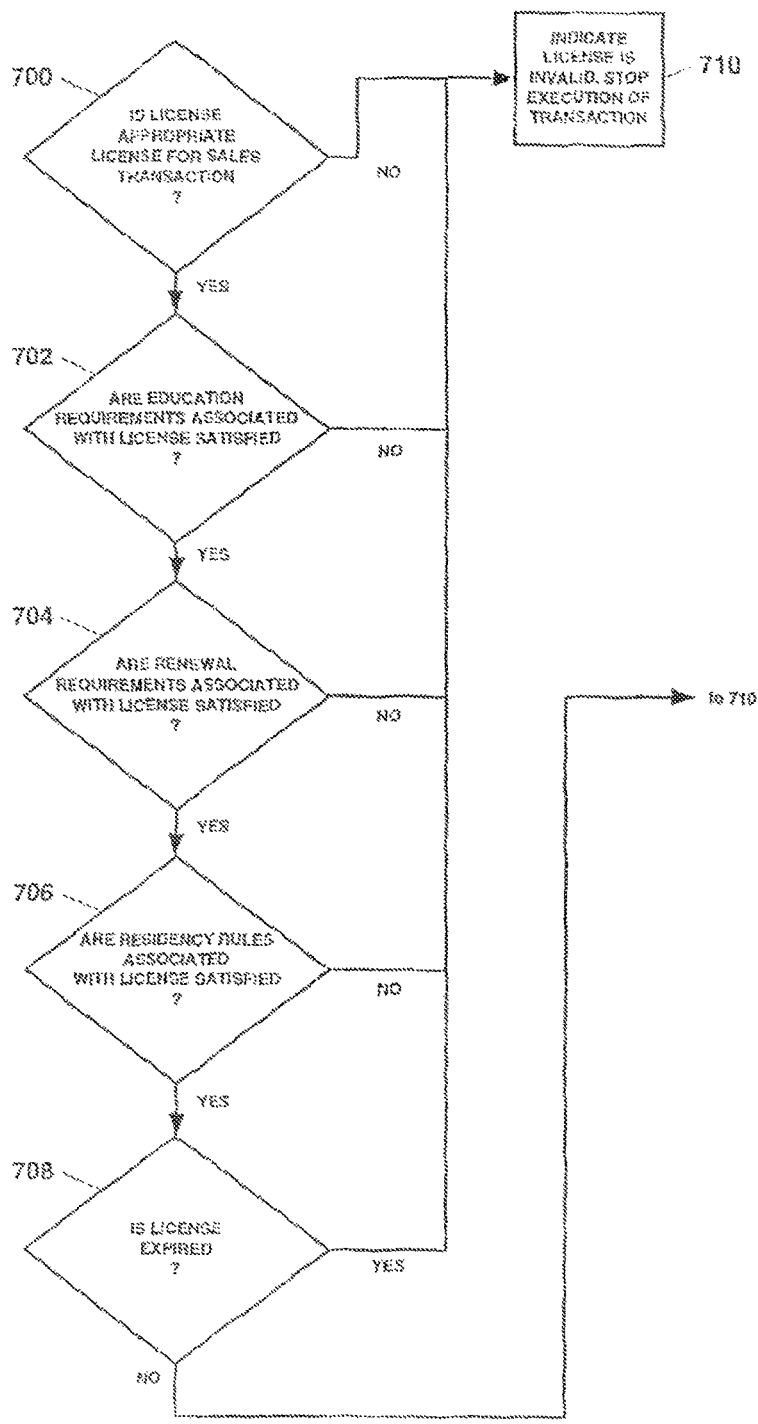
FIG. 7a is a process flow that illustrates some of the decisions that may be made when checking the validity of licensing or appointment credentials in accordance with in embodiment of the invention.
Figure 7B:
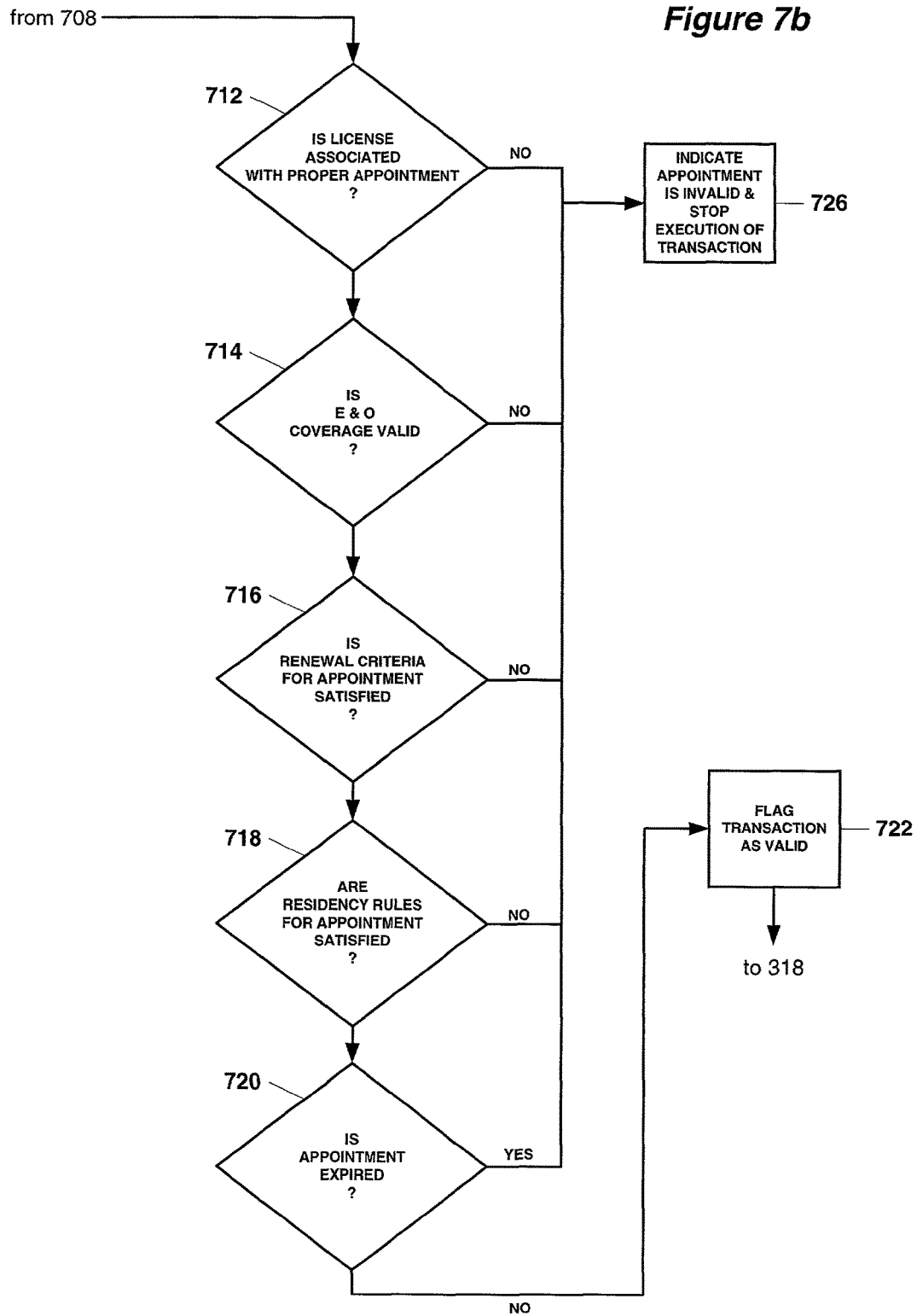
FIG. 7b is a process flow that illustrates some of the decisions that may be made when checking the validity of licensing or appointment credentials in accordance with in embodiment of the invention.

An embodiment of the invention comprises a mechanism for specifying licensing information and defining the rules that govern licenses held by parties. FIGS. 7a and 7b provides and example of some of the decisions that may be made when checking the validity of licensing or appointment credentials. (e.g., step 316). For example, the user may specify rules that define the following types of information:

1. The educational credits required in order to hold a specific type of license (e.g., step 702). For example, License L requires X units of education credit C.
2. The renewal requirements for a specific type of license (e.g., step 704). For example, License L must be renewed every T units of time.
3. The residency rules associated with a specific type of license (e.g., step 706). For example, License L is required in jurisdiction J. The user may associate license types with product types and a jurisdiction through license entries in a distributor's license record. The record may include <license type, product, jurisdiction>. Access to the license rules through the distributor license record enables the user to define information relating to the following questions, while factoring in such elements as the type of product to be sold or the state in which it will be sold:
   a) Is a distributor qualified to hold a license (for instance, does the distributor have sufficient educational credits)?
   b) Does the distributor have the right license to sell (e.g., step 700), Licenses, Jurisdiction, Education Credits, Products service, or illustrate a product?
   c) Does the distributor have a license that will expire (e.g., step 708) within a specified period of time?

If any of the above conditions indicate the license if not valid, the system executes step 710 where it stops execution of the transaction relating to the invalid license. Thus, the sales representative will not receive any compensation for invalid transactions. The system's licensing mechanism may be utilized to define licensing parameters relating to any party in the system (e.g., institutions, distributors, sales representatives, etc. . . . ).

An embodiment of the invention also provides a mechanism for identifying and defining the rules that govern appointments held by parties. For example, the user may specify rules that define the following types of information:

1. Does a specific appointment require a certain license (e.g., step 712) ? For example, Appointment A requires license L.
2. Does an appointment require errors and omissions (E & O) coverage (e.g., step 714)? For example, Appointment A requires E&O coverage by Distributor D.

3. What are the renewal requirements for a specific type of appointment (e.g., step 716)? For example, Appointment A must be renewed every T units of time.
4. What are the residency rules associated with a specific type of appointment (e.g., step 718)? For example, Appointment A is required in jurisdiction J. The association of an appointment type with a product type, a jurisdiction, and an institution is made in the appointment record associated with a distributor. The record specifies <appointment type, product, jurisdiction, institution>. The user can access the appointment rules through the distributor license record. These rules enable the user to determine outcomes associated with the following questions, while factoring in such elements as the type of product to be sold or the state in which the product will be sold:
   a) Is a distributor qualified to hold an appointment? For example, do does the distributor have sufficient E&O coverage?
   b) Does the distributor have the right appointment to sell a product?
   c) Does the distributor have an appointment that will expire within a specified period of time (e.g., step 720)?
   d) What are the cancellation rules associated with an appointment? The set of appointment rules of the system software can be Appointments, Licenses, Products, Jurisdiction.

If any of the above conditions indicate the appointment if not valid, the system executes step 726 where it stops execution of the transaction relating to the invalid appointment. If the conditions are met, the system executes step 722, where it flags the transaction being processed as valid and passes the transaction data to commission engine for processing (e.g., step 318 of FIG. 3: described in further detail below).

D) Transaction Processing:

Once the licensing and appointment data is defined. The system may be configured to process transaction data associated with the sale of different products. The system will ensure that the terms of the selling agreement are followed and that the licensing and appointment requirements are not violated with respect to each transaction executed by the system. Referring back to FIG. 3, when an embodiment receives transaction data (e.g., at step 310) that data is converted to interface with the system (e.g., at step 312). Transaction data comprises the information associated with the sale of a product. The system is configured to process one or more transactions at a time and may perform transaction processing in batches if such processing is desirable. However, the invention also contemplates other forms of transaction processing and may, for example, process each transaction entered into the system when it is entered.

Step 312 may be performed in accordance with one embodiment of the invention by a transaction loader. The transaction loader converts the transaction data into a form that can be processed by the system. For example, the transaction data may be loaded into an object model configured to interface with the system embodying one or more aspects of the invention. The transaction data (e.g., transaction objects) may indicate which party sold what to whom and identify the appropriate agreements associated with the sale. For example in accordance with one embodiment of the invention, the transaction data identifies which distributor was responsible for the sale and what agreement that distributor is operating under. As step 314, the system resolves the associations contained in the transaction data and thereby determines the scope of analysis to be performed by the system.

In one embodiment of the invention, input transactions refer to an Agreement Relationship ID that indicates which parties were involved in the transaction and what agreement is application. The Agreement Relationship ID is a customizable string value associated with every selling agreement relationship entered into the system. In the following example, the Agreement Relationship ID is made to be readable but unique.

| Transaction 1 | Transaction 2 | Transaction 3 |
| --- | --- | --- |
| AgentCode = TexA4 | AgentCode = TexA4 | AgentCode = TexA3 |
| Product = Variable | Product = Variable | Product = Traditional |
| Packaged: n/a | Packaged: by Ed in A2 | Packaged: n/a |

To process the input transactions, the system embodying the invention provides a commission engine preprocessor, (referred to as the DMS engine). The DMS engine (or some other component of the system) evaluates the input transactions (e.g., in batches until all available have been processed) and for each transaction associates an agreement (e.g., agreement object) and sales team member (e.g., sales representative).

During the evaluation process the system determines whether the sales team member and the distributor associated with the transaction have valid credentials (e.g., step 316). Credentials are evaluated according to the license and appointment rules stored in the system and associated with the distributor or sales representative responsible for the transaction. For example, the system may determine if the sales representative is appropriately licensed and if the distributor that sales representative works for has properly appointed that sales representative. The system may check to see if an individual in the distributor hierarchy has the necessary license and appointment. The license/appointment check is performed in order to compensate a distributor for a specific sale or service transaction. Compensation may be paid for events such as the following:
1. When the distributor wants to perform a product illustration.
2. At the time of new business installation.
3. At the point of service.

The system can also check on licenses and appointments for the distributor's supervisors. The system requires a license validation when appointments are processed. The logic associated with this function performs the following steps:
1. Determines the license and appointment requirements for the distributor based on the values of the product, jurisdiction, and institution parameters passed to the function.
2. Determines whether the distributor possesses the required license and appointment types, or a blanket assignment. For example, some states do not permit a corporation to be licensed require them to have a blanket assignment. The rules evaluation used to determine the required license and appointments can also include other factors such as the compensation type (for example, the first year commission or renewal), the residency of the distributor, or the role of the distributor.

If the credentials are valid, the system may perform commission processing. Otherwise an error results and the transaction associated with the error is not processed by the system (e.g., step 317).

The system also identifies any other agreement objects affected by the input transaction. If the system locates an affected agreement object, it creates additional transactions that process compensation according to the newly identified agreement commission models. Once all input transactions have been associated with agreements, the system (e.g., DMS engine) invokes the commission engine and performs commission processing (e.g., at step 318). Commission processing involves determining the amounts to be paid to parties involved in the transaction by processing the transaction based on rules defined by the selling agreement. The commission engine may utilize the commission model referenced above to determine the amounts paid.

When a transaction is processed the ID on the transaction is used to identify the agreement relationship related to the party or parties submitting the business. The agreement relationship provides access to the compensation component that references the commission model utilized in the agreement and identifies the parties involved in the transaction. The following Table 1 shows which distributors are compensated based on the compensation elements of some sample agreements.

TABLE 1

| Case | Party A | Based-on | Party B | Based-on | Party C | Based-on | Party D | Based-on | Party E | Based-on |
|------|---------|----------|---------|----------|---------|----------|---------|----------|---------|----------|
| 1 | 0 | Agmt 4 | 80% | Agmt 4 | 0 | n/a | 6% | Agmt 1 | 1% | Agmt 5 |
| 2 | 0 | Agmt 4 | 80% | Agmt 4 | 15% | Agmt 2 | 1% | Agmt 1 | 1% | Agmt 5 |
| 3 | 50% | Agmt 3 | 0 | n/a | 45% | Agmt 3 | 5% | Agmt 1 | 1% | Agmt 5 |

For example, Table 1 above illustrates that under agreement 1 (e.g., Agmt 1) Party D, will be compensated 1% for each of the 3 submitted transactions. Party A will receive 0 dollars under agreement 4, but receives 50% pursuant to agreement 3. Party B on the other hand receives 80% under agreement 4. The compensation component of agreement 2 defines that party C receives 15% of transaction performed under that agreement. Party C also receives 45% of transactions performed pursuant to agreement 3. Agreement 5 provides that Party E receives 1% of the transactions performed pursuant to the agreement. The compensation components associated with each selling agreement define the commission structures illustrated in Table 1.

When the commission amounts are calculated, the system may process the amounts using the debt management/payment modules to determine an actual amount paid to the user (e.g., step 320 and 322). The functionality for determining payment taking into account any debts may be encapsulated into the debt management module and a payment module. The debt management module enables the user to administer and maintain the issuance, transference, and recovery of debt (for example, advances, draws, or loans). In addition to encapsulating these debt rules, the debt management module also provides an automated process for advancing funds according to debt rules defined in the system. Thus, the debt management module enables a financial services institution to manage distributor advances and repayments. For example, the debt management module may deduct an amount from the commission paid pursuant to a set of rules for debt repayment established by the user. So that the debt management module may perform this and other operations discussed above, the commission engine provides the debt management module with a set of ledger items 1 through N. These ledger items represent the outputs of the commission engine.

The debt management module enables a financial services institution to manage party advances and repayments. With the debt management module, the user can define and manage the business rules and parameters associated with the approval and payment of advances. Users can also make adjustments to advance balances based on actual dollars received from commission and accelerate repayment schedules if commissions fall short. The debt management module also enables the user to define the rules and parameters associated with advances. In accordance with one embodiment of the invention, the user can utilize the debt management module to define at least the following items:

Classes of distributors who qualify for advances.
Qualification criteria for advances, such as the distributor's length of service, sales history, and past earnings.
Ratio of advances to projected income, taking into account any outstanding advances.
Repayment schedule and interest rate to be paid.
Source of repayment income or the policy the advance is to be recouped from.
Whether the amount is a percentage or flat rate.
Accelerated repayment schedules. For example, if a distributor's income projections fall below repayments, the user may wish to re-negotiate the repayment terms to accelerate them.

The debt management module also enables the user to perform activities such as initiate advances and repayment schedules and track performance of debts. The system identifies debts as performing or non-performing (no repayment activity). In one embodiment of the invention, the debt management module comprises a debt management viewer that enables the user to view debt management rules and data definitions, a debt management editor that manages debt management rules and data definitions. A debt management user with the appropriate level of authorization can review and approve financial debt management requests. The debt management engine automates the process of issuing and maintaining debt and may execute within a payment engine (described in further detail below) or individually instantiated and dispatched. In one embodiment of the invention the debt management module is executed as a background process (to perform routine debt management operations). However, users can also initiate the debt management process manually. When the debt management process executes it examines the states of financially related attributes of one or more parties managed by the system and makes debt-maintenance decisions based upon the predefined debt management rules active for each party.

One embodiment of the invention allows issuance of debt (e.g., advances, draws, or loans) for a party in a multiple step process. First the user has to set up debt issuance rules; these rules could apply to all parties in the system, group of parties or may be party specific. The user can also specify a rule based on some criteria in the object model. After setting up debt rules, debt could be issued to the party depending on their qualification. The system offers the flexibility to choose the method of payment for each debt being issued. Additionally, embodiments of the invention provide a method for approval of the debt, whereby debt repayment rules are introduced so that the debt could be repaid from the available earnings of the distributor. Debt collection mechanisms for defaulters are also provided. Debt management may also include the follow-up steps associated with an unpaid debt. Some examples of such rles include the following:

1. The user may define how long a debt may remain unpaid before the first notification is sent.
2. How long after the first notification before a reminder letter is sent.
3. How long after the reminder letter is sent before the collection agency procedure begins.

The system designed in accordance with one embodiment of the invention provides a mechanism that enables users with the appropriate level of authority to analyze advances (e.g., debts). This analysis evaluates the state of advances and generates an exception list. The exception list includes advances awaiting approval. The analysis can also include an assessment of actual advance repayment compared to projected repayment. The user can use this assessment to initiate the collection process for cases in which legal action is required. The exception list can be structured so that different users of the system can view and respond to subsets of the full list.

In an embodiment of the invention the functions for consolidating net payment are incorporated into a net pay module (executed e.g., at step 322). The net pay module enables financial institutions to track and calculate payments to distributors. Thus, the net pay module provides functionality for initiating payments to parties defined in the system. For example, the module may determine a party's net pay by adjusting the party's total earned compensation (calculated by the commission engine described above) according to a set of payment adjustment rules. These rules can be used to capture repayment schedules for outstanding debt, model IRS garnishing, and transfer payments to an alternate payee. In accordance with one embodiment of the invention this module also allows parties to split up net payments into individual disbursements and direct different parts of compensation to different accounts. In one embodiment of the invention, the net pay module is associated with a net pay viewer that enables system users to view payment rules and data definitions as well as a net pay editor which enables the user to manage payment rules and data definitions.

In one embodiment of the invention the net pay module comprises a payment engine that utilizes the ledger items created by the commission engine for a distributor as input. Thus, the payment engine is responsible for processing incoming compensation and debt issuances. For example, the payment engine may utilize ledger items to compute total compensation (i.e., payments) for the distributor, to distribute payments into accounts specified by the distributor, and to pay debts of the distributor. Once the commission amounts are processed by the payment system, the amounts earned may be distributed to the appropriate parties. The payment engine may also provide the ability to split the total compensation for a party into various methods of payments. These splits can be tracked by adding various constraints (related to a financial industries business model). The system user (which may be an authorized party) has the flexibility to model or customize the payment rule/constraints. Payment splits support pay-outs to alternate payee from funds of a party. The user may specify deduction rules which can be applied to party earnings to facilitate deductions for items such as taxes, mutual funds etc. The system comprises global deduction components, which form the template for adding deduction rules for a party.

Misc. System Functions:

A) Rule Processing:

In accordance with one embodiment of the invention, the system comprises mechanisms that enable the user to specify the functions that execute various types of rules on the information managed by the system. The user may specify the functions associated with executing rules against the information managed by the system. The system executes rules implicitly as a result of a user-driven change to the data state, or explicitly as a result of a calendar-scheduled event. The user may use arbitrary dates, or anniversary or expiration dates as a basis for the calendar-scheduled events. The user can also set up explicit function calls that result in the execution of rules. For example, the user may configure the system to evaluate the rules as a result of a change in the distributor hierarchy, contract kit change, or selling agreement change. In some instances, the system can be utilized to determine if a background check is required. The rules and outcomes determined by these rules are evaluated in accordance with one embodiment of the invention by a configuration engine. The rule processing performed by the configuration engine is described in further detail in U.S. Pat. No. 5,825,651, entitled "Method and Apparatus for Configuring Systems", which is incorporated herein by reference.

The system embodying the invention may utilize the configuration engine to process rules. For example, the user may execute rules associated with the position of individuals and their role(s) within the distributor hierarchy. The function includes the evaluation of the licensing and appointment requirements and rules for each individual. The rules associated with supervised and supervising individuals can also evaluated.

The system also provides a mechanism that executes the rules associated with the change of a contract kit. When a contract kit is changed, active selling agreements based on the contract kit may be evaluated against the new contract kit definition. This includes evaluating whether required components are present in the active selling agreement and whether the parameters associated with the active selling agreement are within the automatic approval limits set by the contract kit.

Embodiments of the invention provide functions for executing the rules associated with the change of a selling agreement. When a selling agreement is changed, the selling agreement is evaluated against the contract kit definition from which the agreement was derived. This includes evaluating whether required components are present in the selling agreement and whether the parameters associated with the selling agreement are within the automatic approval limits set by the contract kit.

If it is desirable to determine background information about a distributor, the user may execute the system function that determines whether a background check is required for a certain distributor. The role(s) associated with the distributor determine which decision rules are used in determining if a background check is required.

B) Information Analysis:

Embodiments of the invention may provide users with a technique for performing information analysis. For example, the system has multiple functions for analysis routines executed against the information managed by the system. During analysis, the system may track requests and status. A major component of the analyze information category is the tracking of requests and status. Analyzing information can result in the invocation of rules managed within the system. Some examples of the types of analysis functions the system may perform, and the type of data acted upon follow:

For example, the system may be utilized to analyze distributor hierarchy for tracked items: This function enables a user with the appropriate level of authority to execute an analysis of the distributor hierarchy. This analysis causes an evaluation of the distributor hierarchy rules and generates an exception list, which can be viewed. The user may define the set of exceptions during deployment. Examples of exceptions include:

- Distributors with no/invalid licenses or appointments, where one is required given their current role (including the time since expiration of the previous valid license/appointment).
- Distributors with licenses or appointments that will expire within a pre-determined period
- Distributors with educational credit requirements that will expire within a pre-determined period
- Distributors who have a grace period in which to acquire a license or appointment, or to complete educational credits
- Distributors whose grace period in which to acquire a license or appointment, or to complete educational credits, has expired
- Distributors whose E&O insurance will expire within a pre-determined period
- Distributor background check status
- Distributors without valid selling agreements
- Distributors whose selling agreements will expire within a pre-determined period
- Advances on which repayment conditions are not being met. The exception list can be structured such that different users of the DMS suite can view and respond to subsets of the full list.

Embodiments of the invention also provide for integration of the system with external software applications and databases. The backbone-based architecture enables companies to integrate with enterprise software and databases. The backbone's programming interface provides bi-directional requests and responses with external software, as well as access to company databases or those of a third party, such as a regulatory body. The company's implementation of the system may involve integration with several software systems and databases. Examples include:

- External software applications
- Appointment resources, such as Pictorial's AppointPAK service
- Appointment resources, such as provided by state web sites
- Licensing resources, such as Pictorial's PAL service
- Licensing resources, such as provided by state web sites
- Word processing or similar programs, such as Microsoft Word™
- Email applications, such as Microsoft Exchange™ or Lotus Notes®
- New business applications
- Policy administration applications
- External databases
- Producer databases, such as those provided via state web sites C) Workflow:

Embodiments of the invention contain a workflow service that enables the user to create and run business processes. These processes become objects (business rules) in the backbone. The workflow service works with the backbone and databases, passing objects, functions, and data into the backbone. Thus, the workflow service provides a mechanism for enabling user to control and mange the flow of information. The elements of workflow in the system in accordance with one embodiment of the invention are requests for approval, approvals, and denials. The user can customize the system to send email notifications at these points. To set up such email notification, the user may execute code that causes system workflow triggers to fire, initiating the notification. The appropriate user can then take action if, for example, a request is not approved.

Reporting—Specifies the functions associated with generating reports about the information managed by the DMS suite. The Reporting category specifies the functions for generating reports about the information managed by the DMS suite. The suite provides a standard set of data views for the information it manages. These views give the user the ability to define and create customer-specific reports, using the users own reporting tool. The standard data views include data from the following sources:

e) Distributor hierarchy
f) License and appointment status and statistics
g) Selling agreement status and statistics
h) Debt management status and statistics Security—Specifies the functions associated with the management of different types of users and the access control that permits them to perform specific tasks within the DMS software. The Security category specifies the functions associated with managing users and the access controls that enable them to perform specific tasks within the DMS suite. DMS software uses role-based access control, in which each role has specific permissions for accessing processes. When the user creates users in the system, the user can assign them one or more of these access roles. Users' roles determine the tasks they can perform. These tasks include the ability to manage, view, and approve new and updated data about distributors. The user's role also flags users who should receive analysis results and event notifications. Users can customize user roles to suit a particular set of business practices. The following table describes each security function and identifies the data acted upon by this function.

Create, view, update, and delete user access role. Enables a user with the appropriate level of authority to enter, update, and delete user access roles within the DMS suite. Definition of a user role includes the rights that a user has to manage, view, and approve specific data and entities. A user access role identifies which of these tasks and data a user may access. When a user executes a task or manipulates data, the system checks to see if the currently logged-in user profile includes a role with access to the task. The DMS suite includes a set of default access roles. Users can add or modify the defaults when deploying the system.

Create, view, update, and delete user. Enables a user with the appropriate level of authority to enter, update, and delete users within the DMS suite. When the system creates users, it specifies the user role(s) associated with them.

Thus, a method and apparatus for processing sales transaction data has been described. Particular embodiments described herein are illustrative only and should not limit the present invention thereby. The claims and their full scope of equivalents define the invention.

What is claimed is:

1. A method for automating processing sales transaction data and transforming data and components into a digital selling agreement, the method comprising:
performing by a computer system programmed to execute code, wherein the code is loaded in a memory of the computer system and executable by the processor to transform the computer system into a machine for:
obtaining data, via a backbone, associated with an institution having one or more products and a distributor having one or more sales representatives for performing a plurality of sales transactions, wherein the backbone interacts with one or more databases containing the data and eliminates development of at least some custom code and allows integration with applications;
obtaining components, via the backbone, including one or more document components and one or more compensation components and the compensation components are distinct from the document components, associated with a selling agreement between said institution and said distributor, said selling agreement relating to said one or more products;
processing rules stored in a memory coupled to a processor of the computer system to determine, in accordance with at least a portion of the data associated with the institution and the distributor, which of at least one of the document components and at least one of the compensation components to include in the selling group;
accessing a configuration engine and executing the configuration engine to transform at least a portion of the data and components into said selling agreement based on the processing of the rules associated with said components so said selling agreement includes the document and compensation components determined by the processing of the rules; and
providing data for presenting said selling agreement to one or more data processing systems of representatives associated with said institution and said distributor.

2. The method of claim 1 wherein said one or more compensation components identify a compensation schedule for paying said one or more representatives.

3. The method of claim 2 further comprising:
obtaining regulatory information associated with said plurality of transactions;
obtaining sales transaction data, said sales transaction data identifying at least one of a plurality of sales transaction;
evaluating regulatory information associated with said sales transaction data to determine if regulations relating to selling said one or more products were violated.

4. The method of claim 3 wherein said regulatory information relates to credentials of said one or more sales representatives.

5. The method of claim 3 further comprising:
evaluating said sales transaction data to determine commission amounts to be paid to said one or more sales representatives.

6. The method of claim 5 wherein said evaluating utilizes said compensation schedule defined in said components of said selling agreement.

7. The method of claim 6 further comprising:
determining a net payment amount to be distributed to said one or more sales representatives;
deducting a debt amount from said net payment amount based on debt rules;
generating a payment amount;
paying out said payment amount to said one or more sales representatives.

8. The method of claim 6 wherein said one or more document components further comprise text supporting a legally binding agreement between said institution and said distributor.

9. The method of claim 2 wherein said one or more products comprise a service.

10. The method of claim 2 wherein said rules for generating said selling agreement are obtained from a contract kit.

11. The method of claim 1 wherein said presenting said selling agreement comprises generating a text version of said selling agreement for signature by said distributor and said institution.

12. A non-transitory, computer readable medium comprising:
a computer usable medium having code stored therein for automating processing sales transaction data and transforming data and components into a digital selling agreement and executable by a processor to transform a computer system into a machine to:
obtain data, via a backbone, associated with an institution having one or more products and a distributor having one or more sales representatives for performing a plurality of sales transactions, wherein the backbone interacts with one or more databases containing the data and eliminates development of at least some custom code and allows integration with applications;
obtain components, including one or more document components and one or more compensation components and the compensation components are distinct from the document components, associated with a selling agreement between said institution and said distributor, said selling agreement relating to said one or more products;
process rules stored in a memory coupled to a processor of the computer system to determine, in accordance with at least a portion of the data associated with the institution and the distributor, which of at least one of the document components and at least one of the compensation components to include in the selling group;
access a configuration engine and execute the configuration engine to transform at least a portion of the data and components into said selling agreement based on the processing of the rules associated with said components so said selling agreement includes the document and compensation components determined by the processing of the rules; and
output said selling agreement to one or more data processing systems of representatives associated with said institution and said distributor.

13. The non-transitory, computer readable medium of claim 12 wherein said one or more compensation components identify a compensation schedule for paying said plurality of sales representatives.

14. The non-transitory, computer readable medium of claim 12 further comprising:
obtaining regulatory information associated with said plurality of transactions;
obtaining sales transaction data, said sales transaction data identifying at least one of a plurality of sales transaction;

evaluating regulatory information associated with said sales transaction data to determine if regulations relating to selling said one or more products were violated.

15. The non-transitory, computer readable medium of claim 14 wherein said regulatory information comprises licensing information associated with selling said one or more products.

16. The non-transitory, computer readable medium of claim 14 wherein said regulatory information further comprises appointment information associated with selling said one or more products.

17. The non-transitory, computer readable medium of claim 14 wherein said regulatory information relates to credentials of said sales representative.

18. The non-transitory, computer readable medium of claim 14 wherein said regulatory information relates to credentials of said distributor.

19. The non-transitory, computer readable medium of claim 14 further comprising:
   evaluating said sales transaction data to determine commission amounts to be paid to said one or more sales representatives.

20. The non-transitory, computer readable medium of claim 19 wherein said evaluating utilizes said compensation schedule defined in said components of said selling agreement.

21. The non-transitory, computer readable medium of claim 20 wherein said one or more document components further comprise text supporting a legally binding agreement between said institution and said distributor.

22. The non-transitory, computer readable medium of claim 19 further comprising:
   determining a net payment amount to be distributed to said one or more sales representatives;
   deducting a debt amount from said net payment amount based on debt rules;
   generating a payment amount;
   paying out said payment amount to said one or more sales representatives.

23. The non-transitory, computer readable medium of claim 12 wherein said one or more products comprise a service.

24. The non-transitory, computer readable medium of claim 12 wherein said rules for generating said selling agreement are obtained from a contract kit.

25. An apparatus for processing sales transaction data comprising:
   a processor;
   a memory coupled to said processor, wherein said processor includes code therein for automating processing sales transaction data and transforming data and components into a digital selling agreement and the code is executable by the processor to transform a computer system into a machine to:
      obtain data, via a backbone, associated with an institution having one or more products and a distributor having one or more sales representatives for performing a plurality of sales transactions, wherein the backbone interacts with one or more databases containing the data and eliminates development of at least some custom code and allows integration with applications;
      obtain components, including one or more document components and one or more compensation components and the compensation components are distinct from the document components, associated with a selling agreement between said institution and said distributor, said selling agreement relating to said one or more products;
      process rules stored in a memory coupled to a processor of the computer system to determine, in accordance with at least a portion of the data associated with the institution and the distributor, which of at least one of the document components and at least one of the compensation components to include in the selling group;
      access a configuration engine and execute the configuration engine to transform at least a portion of the data and components into said selling agreement based on the processing of the rules associated with said components so said selling agreement includes the document and compensation components determined by the processing of the rules; and
      a display screen configured to output said selling agreement to one or more data processing systems of representatives associated with said institution and said distributor.

26. The apparatus of claim 25 wherein said one or more compensation components identify a compensation schedule for paying said one or more sales representatives.

27. The apparatus of claim 25 wherein said code is further executable by the processor to:
   obtain regulatory information associated with said plurality of transactions;
   obtaining sales transaction data, said sales transaction data identifying at least one of a plurality of sales transaction;
   evaluating regulatory information associated with said sales transaction data to determine if regulations relating to selling said one or more products were violated.

28. The apparatus of claim 27 wherein said regulatory information comprises licensing information associated with selling said one or more products.

29. The apparatus of claim 27 wherein said regulatory information further comprises appointment information associated with selling said one or more products.

30. The apparatus of claim 27 wherein said regulatory information relates to credentials of said one or more sales representatives.

31. The apparatus of claim 27 wherein said regulatory information relates to credentials of said distributor.

32. The apparatus of claim 27 further configured to evaluate said sales transaction data to determine commission amounts to be paid to said one or more sales representatives.

33. The apparatus of claim 32 wherein said evaluating utilizes said compensation schedule defined in said components of said selling agreement.

34. The apparatus of claim 33 wherein said one or more document components further comprise text supporting a legally binding agreement between said institution and said distributor.

35. The apparatus of claim 32 wherein said mechanism is further configured to:
   determine a net payment amount to be distributed to said one or more sales representatives;
   deduct a debt amount from said net payment amount based on debt rules;
   generate a payment amount;
   pay out said payment amount to said one or more sales representatives.

36. The apparatus of claim 25 wherein said one or more products comprise a service.

37. The apparatus of claim 25 wherein said rules for generating said selling agreement are obtained from a contract kit.

38. The apparatus of claim 25 wherein said presenting said selling agreement comprises generating a text version of said selling agreement for signature by said distributor and said institution.

39. The apparatus of claim 25 wherein said presenting said selling agreement comprises generating a text version of said selling agreement for signature by said representatives of said distributor and said institution.

\* \* \* \* \*